United States Patent
Boulanger et al.

(10) Patent No.: US 6,882,465 B1
(45) Date of Patent: Apr. 19, 2005

(54) TUNABLE FREQUENCY-CONVERTING OPTICAL DEVICE

(75) Inventors: Benoit Boulanger, Fontaine les Dijon (FR); Jean-Philippe Feve, Dijon (FR); Bertrand Menaert, Auxonne (FR); Gerard Marnier, Talant (FR)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/856,710
(22) PCT Filed: Nov. 27, 1998
(86) PCT No.: PCT/FR98/02563
§ 371 (c)(1),
(2), (4) Date: Feb. 26, 2002
(87) PCT Pub. No.: WO99/28785
PCT Pub. Date: Jun. 10, 1999

(30) Foreign Application Priority Data

Nov. 27, 1997 (FR) ............................................ 97 14947

(51) Int. Cl.$^7$ .............................. G02F 1/35; G02F 2/02
(52) U.S. Cl. ....................................... 359/326; 359/330
(58) Field of Search ................................ 359/326–332; 372/21–22

(56) References Cited

U.S. PATENT DOCUMENTS

| 5,130,996 A | * | 7/1992 | Amano et al. ................. 372/21 |
| 5,290,485 A | * | 3/1994 | Gotoh et al. ................. 252/589 |
| 5,459,744 A | * | 10/1995 | Hayashi ........................ 372/21 |
| 5,644,422 A | * | 7/1997 | Bortz et al. ................. 359/326 |

FOREIGN PATENT DOCUMENTS

| FR | 2 738 360 A | * | 3/1997 |
| JP | 04-242229 A | * | 1/1993 |
| JP | 06-175181 A | * | 6/1994 |

* cited by examiner

Primary Examiner—John D. Lee
(74) Attorney, Agent, or Firm—Allen, Dyer, Dopplet, Milbrath & Gilchrist, P.A.

(57) ABSTRACT

The invention concerns a device for generating, by interaction(s) with three or four waves from one or several incident optical radiation(s), one or several emergent radiation(s) tuneable at least in frequency. The invention is characterized in that it consists essentially of a crystal with non-linear optical property whereof the surface defines a cylindrical volume with complete revolution, or truncated on at least two opposite faces symmetrical relative to its axis of revolution, or partial on one of two said faces. Said device is particularly designed for applications in spectroscopy, remote sensing, long-distance transmission, remote guiding. The invention also concerns a method using said device.

38 Claims, 11 Drawing Sheets cylindroid 2

Figure 2G:
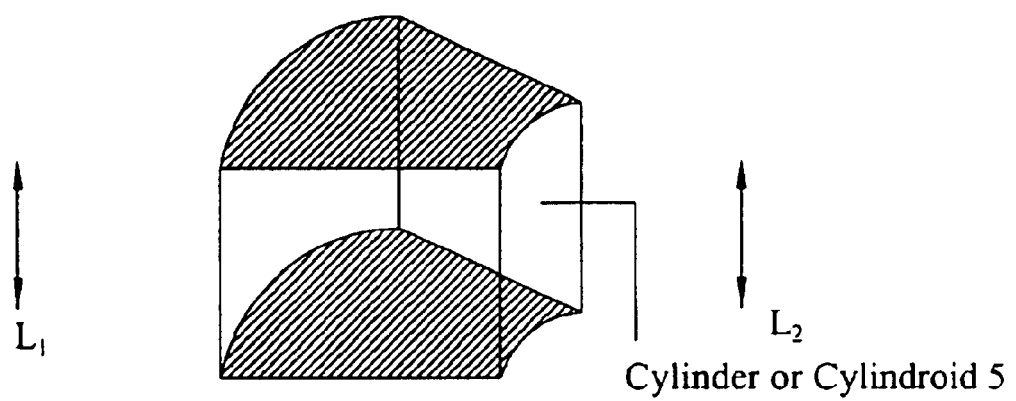

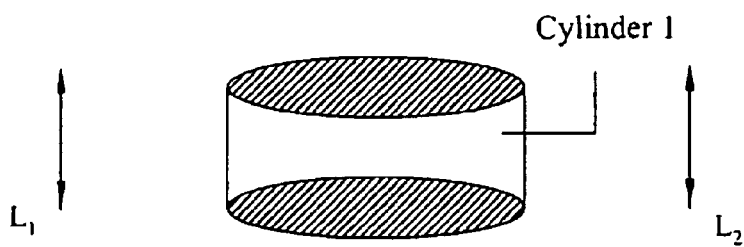
Figure 2a
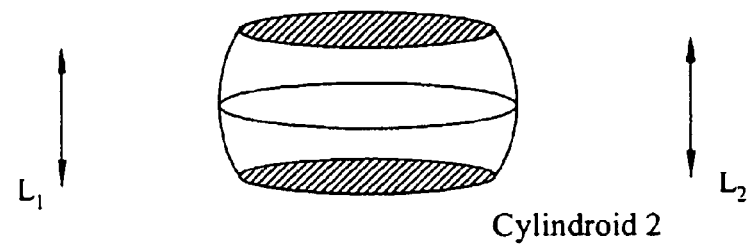
Figure 2b
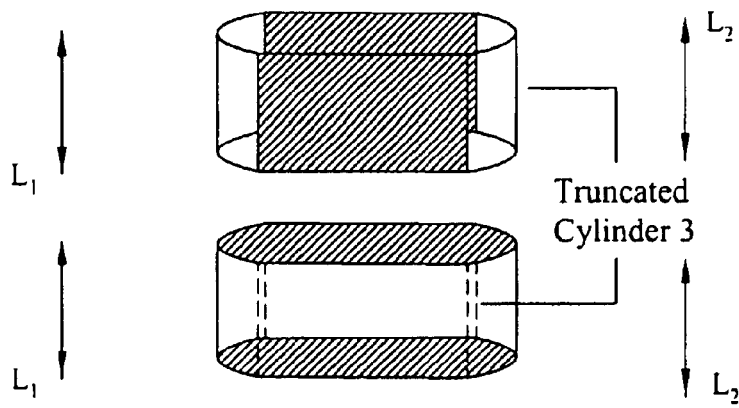
Figure 2c
Figure 2d
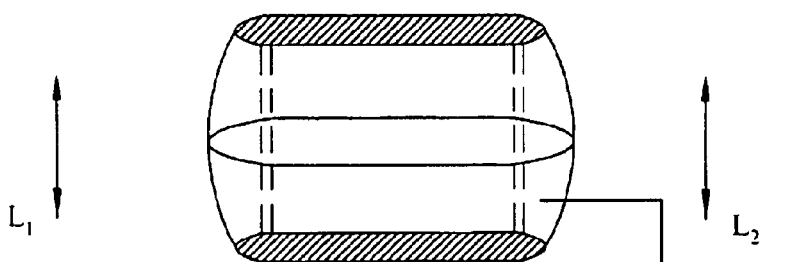
Figure 2e
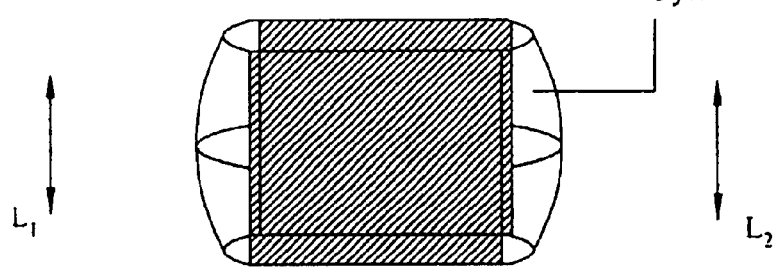
Figure 2f Cylinder 1 with a circular section

TUNABLE FREQUENCY-CONVERTING OPTICAL DEVICE

The present invention generally relates to a device and a method for generating optical radiations at least tunable in frequency.

Various devices and methods are presently available for frequency conversion by non-linear optical interaction with phase tuning or quasi phase tuning. However, none of these devices is fully functional and/or satisfactory.

On this account, the example of devices using parallelepiped-shaped monocrystals may be mentioned. Certain of these paraellelepipedal monocrystal devices are for frequency conversion by non-linear optical interaction with phase tuning through double refraction. The orientation of the faces of the parallelepiped is then selected according to the desired interaction. Thus, in most cases, as for the generation of the second harmonic for example, a crystal may only be used for a given interaction, i.e., for a particular doublet of frequency (v, 2v), the associated phase tuning direction is orthogonal to the polished faces. However, there are devices based on paraellelepipedal crystals which make use of the angular tunability for parametric amplification or oscillation for example. Because of the losses induced by refraction and the non-colinearity of wave vectors under oblique incidence, there is only a small angular range of the crystal which may be used, typically about ten degrees of external angle on both sides of the directions orthogonal to both parallel faces subject to the radiation. Such an angular deviation is not always sufficient for accessing the entire existing phase tuning directions. On the other hand, refraction under oblique incidence leads to deformation and spectral widening of the generated beams.

Other tunable devices with parallelepipedal materials are for frequency conversion by non-linear optimal interaction with quasi phase tuning. They now use translation with respect to the radiation of a parallelepipedal sample in which several gratings with different periodicities have been engraved. The main drawback of this technique is that it is necessary to achieve, for each jump from one grating to the other, angular or thermal tuning in order to make the generated radiation's spectral band continuous.

This is valid whether the interaction is resonant or not, i.e., whether the sample is placed in a cavity or not.

Other devices of the prior art require an index adaptation medium, and/or do not exhibit satisfactory spectral fineness on a large range of tunability.

The object of the present invention is to overcome the drawbacks of the devices and techniques of the prior art, and it provides a device for generating, through three- or four-wave interaction(s) from one or more incident optical radiation(s), one or more emerging optical radiation(s) at least tunable in frequency, characterized in that it essentially comprises a crystal with a non-linear optical property, the surface of which defines a cylindrical volume of revolution, in a complete or truncated way on at least two opposite and symmetrical quadrants with respect to its axis of revolution or else partly on a single one of these quadrants, and in that it further comprises an optical system for confining and focussing said incident optical radiation(s) on the central portion of said crystal on the one hand, and for collimating and directing said emerging optical radiation(s).

A cylindrical volume of revolution, in the present application, means a volume of revolution described by a line or curve segment moving along two closed curves located in parallel planes. These closed curves may be selected from circles and ellipses.

The term cylindrical volume of revolution therefore means a volume of a cylinder as illustrated under reference number 1 in FIG. 2 (volume described by a curve segment) and a volume of a cylindroid as illustrated under reference number 2 in FIG. 2 (volume described by a curve segment). It should be emphasized that these cylindrical volumes of revolution (cylinder and cylindroid) may have a section selected from a circular section and an elliptical section. Such a section may notably be considered as following a plane orthogonal to the axis of revolution.

This cylindrical volume of revolution comprises, when it is described in a complete way, a basic volume, from which may be derived volumes described in a truncated way, or even in a partial way. Indeed, taking into account the symmetry of the index surface, a rotation of $\Delta\alpha=90°$ of a crystal with a cylindrical volume of revolution with respect to a main axis of the index surface is sufficient for accessing the whole of the possible non-linear optical interactions for frequency conversion.

The cylindrical volume of revolution may therefore be only machined in a truncated way, or in a partial way, while maintaining access to the whole of the possible interactions. Of course, it may also be decided to only machine said cylindrical volume in a truncated or partial way for the simple purpose of limiting the machining to the subset of the particular sought-after interactions.

The truncated machining may only be performed, with respect to the cylindrical volume of revolution, on two opposite properly orientated cylindrical quadrants, symmetrical with respect to the rotation axis, or even on two quadrant portions, the angular deviation $\Delta\alpha$ of which allows propagation of the various sought-after interactions. The resulting volume corresponds to a cylindrical volume of revolution described in a truncated way. Such a truncated volume is illustrated under reference number 3 (truncated cylinder) and 4 (truncated cylindroid) in FIG. 2.

Alternatively, only one of these quadrants or portions of quadrants may be machined. The resulting volume corresponds to a cylindrical volume of revolution described in a partial way. Such a partial volume is illustrated in FIG. 2 under reference number 5 (cylinder or cylindroid portion along planes containing the axis of revolution).

The crystal of the device according to the invention may thus notably have a volume selected from a cylinder volume 1, a cylindroid volume 2, a truncated cylinder volume 3 or 4 (having at least two opposite quadrants of cylindrical volume of revolution and symmetrical with respect to the axis of revolution of said crystal), a partial cylinder or cylindroid volume 5 (cylinder or cylindroid portion having only one of such qaudrants). Said cylinder or cylindroid volumes may have a circular section or an elliptical section, notably along a plane orthogonal to the axis of revolution.

Said crystal has, at least on its useful surfaces, a surface condition suitable for achieving optical interactions. In particular, the surface(s) of said crystal which define a cylindrical volume of revolution are optically polished.

The term "optical radiation", in the present application refers to a beam of electromagnetic waves with a frequency or frequencies belonging to the ultraviolet and/or visible and/or infrared spectrum. The value of this frequency or these frequencies is between about 1 and 15,000 nanometers, and more particularly between 100 and 10,000 nanometers.

A non-linear optical property means in the present application an optical frequency conversion property and/or an electro-optical property.

The device according to the invention has many advantages. Indeed, various types of interactions (notably, optical parametric amplification, generation of second or third harmonics, optical parametric oscillation) may be achieved with it, and this, with phase tuning as well as with quasi phase tuning. It may also be emphasized that, with the device according to the invention, three-wave interactions as well as four-wave interactions may be achieved, and it allows colinear wave vector interactions, in the same way as non-linear wave vector interactions.

The device according to the invention also has the advantage of being able, with a single crystal, to generate radiations with better spatial quality and better spectral fineness, and this over a larger spectral band as compared with presently available devices.

The device according to the invention actually provides refraction under normal to near normal incidence for an elliptical grating, with respect to the surfaces receiving the radiations, regardless of the orientation of the non-linear crystal with respect to the beams, as long as the beams propagate along a diameter of said cylindrical volume. The term "near the normal" aims at a direction with an angular deviation $i(\alpha)$ from the normal direction, such as defined in the following Example 12 and in FIG. 11. Because of this, the interaction for converting frequencies in the crystal always occurs with colinear wave vectors which allows beams to be generated with a better transverse energy profile and better spectral fineness as in the case of the prior art devices. Indeed, in the prior art devices, having a crystal with parallelepipedal geometry, the frequency conversion interaction generally occurs with non-colinear wave vectors as soon as the non-linear crystal is set into rotation and as soon as the beams are no longer under normal or quasi normal incidence, but under oblique incidence, the quality of the emitted beams thereby deteriorates and this all the more since non-colinearity is important.

The device according to the invention is adapted for (and specifically optimized for) tunability in frequency, it utilizes a collimating/focussing system, which notably allows it to control propagation of the radiations. The confining and collimating optical system of the device according to the invention notably is able to provide an optimized control of the propagation of the radiations: it thus offers better spectral fineness associated with a wider tunability spectral range.

It also enables the crystal to be used without it being necessary to immerse it in an index-adapting medium such as a refractive index adapting liquid. Indeed, the device according to the invention does not need any index adapting medium; said crystal may be placed in free air, or in any other medium with an index. The device according to the invention therefore has also the advantages of mechanical simplicity (simplification of the system for holding and setting into rotation the non-linear crystal).

The device according to the invention is particularly adapted for crystals which include at least a hyperpolarizable chemical entity. Said crystal is preferably a crystal selected from a crystal of $KTiOPC_4$, $HTiOAsO_4$, $RbTiOPO_4$, $RbTiOAsO_4$, $CsTiOAsO_4$, $\beta.BaB_2O_4$, $LiB_3O_5$, $KNbO_3$, $LiIO_3$, $LiNbO_3$, $LiTaO_3$, $KD_2PO_4$, $KH_2PO_4$, $NH_4H_2PO_4$, $CsD-AsO_4$, $CsH_2AsO_4$, $AgGaS_2$, $AgGaSe_2$, $ZnGeP_2$, $Tl_3AsSe_3$ and a crystal of GaAs. Advantageously, the size of said crystal is selected from a micrometric size, a millimetric size and a centrimetric size.

According to a configuration of this advantageous aspect, said optical system essentially comprises at least two components placed on both sides of said crystal and selected from a convergent lens, a set of lenses, a reflecting surface or a mirror with the concavity orientated on the side of said crystal, and a reflecting surface or a mirror with the concavity orientated on the opposite side of said crystal. They are selected in order to have a focus and a geometry such that they may be placed at such a focal distance that a first one of them is capable of focussing laser radiation incident on said crystal, and that a second one of them is capable of reducing the divergence of the laser radiation emerging from the crystal. The device according to the invention may comprise one or more pair(s) of such optical components and in particular one or more pair(s) of lenses.

The focal distance of said components is such that the radiation(s) have a dimension which is small as compared to the radius of said crystal in order to limit optical aberrations and to increase the interaction efficiency, and such that this dimension is sufficient in order to prevent any damage to the crystal by a too strong incident intensity. This focal distance is generally between about 50 and 500 mm.

According to another advantageous aspect of the invention, the axis of revolution of said crystal coincides with a rotary mechanical axis so that the crystal may turn around its axis. Such a crystal may then be securely fixed to a geniometric device, advantageously, for controlling its angular displacement.

According to still another advantageous aspect of the invention, said crystal is a crystal with the property of phase tuning through double refraction, such as a monocrystal, or else it is a crystal with a property of quasi phase tuning.

A so-called crystal with a property of quasi phase tuning may have along the sought-after direction of propagation of the radiations, a periodically alternating juxtaposition of monocrystalline domains, i.e., juxtaposition of monocrystalline layers turned by an angle of 180°, one with respect to the other. Such a crystal with the property of quasi phase tuning may also be obtained through machining and juxtaposition of monocrystals, or else even by applying an electric field to a grid of electrodes deposited on the faces orthogonal to the polar axis of a ferroelectric crystal. Advantageously a crystal results, the network of which has a periodicity vector orthogonal to the axis of revolution of said crystal, and which has an effective non-linear coefficient with a periodically alternating sign according to intervals depending on the relevant direction of propagation. The interaction for which the coherence length is equal to an odd multiple of the monocrystalline domain width in the relevant direction of propagation has therefore a maximum efficiency. Alternatively, a crystal with the property of quasi phase tuning adapted to the device according to the invention may have different values for the refraction index, modulated in a periodical way according to the relevant direction of propagation.

According to a further advantageous aspect of the invention, the axis of revolution of said crystal is orthogonal to the plane of the direction(s) of wave vectors of an sought-after interaction, and more particularly to that of the direction(s) providing maximum efficiency for this interaction.

According to a particularly advantageous aspect of the invention, said crystal contains the direction(s) providing maximum efficiency for the interaction, so that they are accessible to said incident optical radiation(s) under normal or near normal incidence (deviation by an angle $i(\alpha)$ with respect to the normal, as defined in the following Example 12—formula 21, notably, and in FIG. 11), with respect to the surfaces receiving the radiations, on one of the surface(s) of said crystal defining a cylindrical volume of revolution, either by rotation of said crystal around its axis of revolution, or by rotation of said incident optical radiation(s) around said crystal in a plane orthogonal to the axis of revolution of said crystal. This particularly advantageous aspect of the invention in the case of said crystal with the property of phase tuning by double refraction, enables only one crystal to be used instead of a plurality of parallelepipedal crystals, and in the case of said crystal with the property of quasi phase tuning, enables a crystal engraved with a single grating to be used instead of a parallelepipedal crystal engraved with a plurality of gratings. Another particularly advantageous aspect of the invention is that, in the case of said crystal with the property of phase tuning by double refraction, tunability may be obtained on a larger spectral domain on the one hand, and the beam attenuation and deformation phenomena which may be observed under oblique incidence may be limited on the other hand, and in the case of said crystal with the property of quasi phase tuning, a more continuous tunability may be obtained.

The crystal of the device according to the invention may have a network of monocrystalline domains selected from a network of plane monocrystalline domains, a network of curved (circular, elliptical) monocrystalline domains. Parameters of such networks are further described in the examples which follow.

This crystalline network, whether plane or curved, may also have periodically alternating domains, notably for a quasi phase tuning operation: the network may then be made up of domains for which the effective coefficient's sign alternates periodically (a+domain, a−domain, . . . ), or for which the value of the refractive index is periodically modulated (an index domain $n_1$, an index domain $n_2 \neq n_2$, . . . ). In the case of a plane network, the volume delimited by this alternating network may also be advantageously surrounded by a monocrystalline crown c for which the effective coefficient's sign does not alternate. This may now be a periodically alternating network, optionally surrounded by a non-alternating monocrystalline crown c. A configuration of an alternating plane network surrounded by a non-alternating crown c is illustrated in the following Example 11 and in FIG. 10. Alternatively, this may be a curved, circular or elliptical periodically alternating network. Such a curved alternating network is notably contemplated in order to prevent or limit losses by refraction or diffusion at the plane interfaces of the + zones and the − zones under oblique incidence. These configurations are illustrated and their parameters, notably for calculating the periodicity, are described in detail in the following figures and examples.

According to an embodiment of the invention, said incident optical radiation(s) comprise (each) one, two, three or four equal or different frequencies, with colinear or non-colinear wave vectors, and under normal or quasi normal incidence (deviation by an angle $i(\alpha)$ with respect to the normal, such as defined in the following Example 12 and in FIG. 11) on one of the surface(s) of said crystal defining a cylindrical volume of revolution. Such radiations may notably be generated by a source of electromagnetic radiations associated with said device.

Preferably, said incident optical radiation(s) are laser radiation(s), such as radiations emitted by a gas laser (helium-neon, ionized argon, nitrogen and carbon dioxide lasers, excimers, a solid laser (ruby, neodymium ions), a liquid dye laser, a semiconductor laser (gallium arsenide), a free electron laser. Notably, they may be laser radiation(s) selected from laser radiation including one or more set frequencies and laser radiation including one or more tunable frequencies.

The device according to the invention is notably suitable for producing three-wave or four-wave interaction(s). Said crystal advantageously has a non-centrosymmetric structure so that said device provides three-wave interaction(s).

According to another embodiment of the invention, said (or at least one of said) incident optical radiation(s) comprise two frequencies for three-wave interaction or three frequencies for four-wave interactions, and said (or at least one of said) emerging optical radiation(s) comprise a frequency which corresponds to the sum of said two or if necessary of three frequencies comprised in said incident optical radiation(s).

According to another embodiment of the invention, said (or at least one of said) emerging optical radiation(s) comprise a frequency equal to a multiple and notably to the double or the triple of a frequency comprised in said (or at least one of said) incident optical radiation(s).

According to yet another embodiment of the invention, said (or at least one of said) incident optical radiation(s) comprise two frequencies for a three-wave interaction, or three frequencies for a four-wave interaction, and said (or at least one of said) emerging optical radiation(s) comprise a frequency which corresponds to a difference between said two, or if necessary three frequencies comprised in said incident optical radiation(s).

According to yet another embodiment of the invention, said (or at least one of said) emerging optical radiation(s) comprises two frequencies for a three-wave interaction, or three frequencies for a four-wave interaction, for which the sum is equal to a frequency comprised in said (or at least one of said) incident optical radiation(s).

Said (or at least one of said) interaction(s) may be an interaction with 4 colinear wave vectors or else an interaction with non-colinear wave vectors.

Said (or at least one of said) interaction(s) preferably are an interaction selected from an optical parameter amplification and a generation of second or third harmonics. The device according to the invention then operates as an optical parametric amplifier, or as a generator of second or third harmonics, respectively.

According to an advantageous embodiment of the invention, said crystal is placed inside a cavity for resonant interaction, and said optical system for confining and focussing said incident optical radiation(s) on the central portion (s) of said crystal on the one hand and for collimating and directing said emerging optical radiation(s) outside said cavity. This optical system in the device according to the invention is necessarily placed outside said cavity. The advantage of this configuration is such that losses by refraction, diffraction, diffusion and absorption are less than those expected if there had been lenses between the crystal and the mirrors of the cavity. This resonant interaction may notably be a three- or four-wave interaction selected from an optical parametric oscillation, an optical parameter amplification and a generation of second or third harmonics. The configuration of said crystal inside said cavity is necessary for obtaining an optical parametric oscillation but is optional for obtaining an optical parametric amplification or a generation of second or third harmonics. In the latter case, it actually aims at increasing the generation efficiencies. The device according to the invention may now operate as an optical parametric oscillator or as an optical parametric amplifier or as a generator of second or third harmonics, respectively.

According to an aspect of this advantageous embodiment, said cavity includes at least an input reflecting surface (receiving the incident radiation(s)) and at least an output reflecting surface (receiving the emerging radiation (s)) facing each other providing resonance of at least one of the interacting waves. The geometry of said cavity is defined according to the specific refraction properties of "dioptres"

(optical media with two interfaces) with a cylindrical volume of revolution of crystals with anisotropic optical properties, in particular with respect to the double refraction angle ρ, the angle between the Poynting vector and the wave vector. The reflection coefficients of the input and output reflecting surfaces are such that the cavity may be resonant either with one, or with two, or with three or possibly with four interacting waves.

In particular, said input reflecting surface is selected from a plane reflecting surface and a reflecting surface having a radius of curvature, with the concavity selected from a concavity orientated on the side of said crystal and a concavity orientated on the opposite side, in order to optimize the oscillation threshold and the stability of the cavity. The distance between the input reflecting surface and said crystal is adapted in order to obtain the sought-after resonance(s).

If at least one of the resonant waves has a non-zero double refraction angle ρ, said output reflecting surface is placed at a distance d from said crystal and has a radius of curvature R, with a concavity selected from a concavity orientated on the side of said crystal and a concavity orientated on the opposite side of said crystal, so that the outgoing and returning beams of the resonant wave (or waves) coincide. The values of d and R advantageously obey equation R=d−L width d greater than L for a concavity orientated on the side of said crystal or to equation R=L−d with d less than L for a concavity orientated on the opposite side of said crystal, with L defined by L=$R_c$ (cos(2ρ)+(sin (2ρ)/tan($ρ_e$))−1), with $R_c$ being the radius of the cylindrical volume of revolution, ρ the angle of double refraction and with $ρ_e$ defined by $ρ_e$≅arcsin(n sin(2ρ)−2ρ), with n the index of refraction of said at least one wave for which resonance is sought after.

For resonant waves having a double refraction angle ρ equal to zero, said output reflecting surface may in particular be selected from a plane reflecting surface and a reflecting surface having a radius of curvature, with the concavity selected from a concavity orientated on the side of said crystal and a concavity orientated on the opposite side, in order to optimize the oscillation threshold and the stability of the cavity. The distance between the output reflecting surface and said crystal is adapted in order to obtain the desired resonance(s).

The geometries of the cavity of the device according to the invention allow the laser beams to make round trips in the crystal without it being necessary to immerse this crystal in a refractive index adaptation medium or to place lenses between the crystal and the mirrors of the cavity. Thus, in the present invention, the level of losses by refraction, diffraction, diffusion and absorption is less than that obtained if there was an refractive index adaptation liquid around the crystal and/or the lenses between the crystal and the mirrors of the cavity. Because of a lower loss level, the oscillation threshold of the cavity is lower, i.e., the beams may be generated in the non-linear crystal with lower intensity of the incident beam on the input mirror of the cavity.

According to another advantageous embodiment of the invention, said device further comprises means for thermostatically controlling said crystal. Such means notably may stabilize the efficiency of the interactions or extend the accessible spectral range. Said crystal is then advantageously held at a lower or higher temperature than the room temperature.

According to another advantageous embodiment of the invention, said device further comprises means for applying a static or low frequency electric field inside and said crystal.

The geometry of the crystal, component of the device according to the invention, actually allows the laser radiation to be easily coupled with a static or low frequency electric field for modulating the efficiency of the interactions or for altering, and in particular for increasing, the accessible spectral range (via the electro-optical effect). Hence, said device may further comprise a pair of electrodes placed on the opposite faces of said crystal.

The device according to the invention has numerous applications, in particular civil or military applications for optical frequency-tunable radiations tunable. It thus advantageously forms a component selected from a spectroscope component, a remote detection component, a remote transmission system component or a remote guiding system component, a LIDAR (Light Detection And Ranging) system component, an optronic counter-measure system component.

The present invention also aims at a method for generating one or more tunable optical radiation(s), at least in frequency, characterized in that it implements a device according to the invention.

An advantageous method according to the invention notably consists of:
 i. generating one or more optical radiation(s) each comprising one or more spectral component(s),
 ii. directing said optical radiation(s) as incident optical radiation(s) towards a so-called crystal under normal incidence on one surface or one of the surfaces of said crystal defining (independently of one another) a cylindrical volume of revolution, in order to generate, outside said crystal
  a frequency corresponding either to a multiple (double, triple) of a frequency of said incident radiation(s), or to the sum, or to a difference between the frequencies of said incident radiation(s), or still further
  several frequencies, the sum of which correspond to a frequency comprised in said incident optical radiation(s),
 iii. if necessary, repeating times i and ii above after suitable rotation of said crystal around its axis of revolution or rotation of said incident optical radiations around said crystal in a plane orthogonal to the axis of revolution of said crystal.

According to a preferred embodiment of this advantageous method according to the invention, said (or at least one of said) incident optical radiation(s) is a laser radiation selected from laser radiation including one set frequency or set frequencies and laser radiation including one tunable frequency or tunable frequencies.

A particularly preferred embodiment of this advantageous method according to the invention further comprises the application of an electric field inside said crystal, in order to produce an electro-optical effect.

Figure 1:
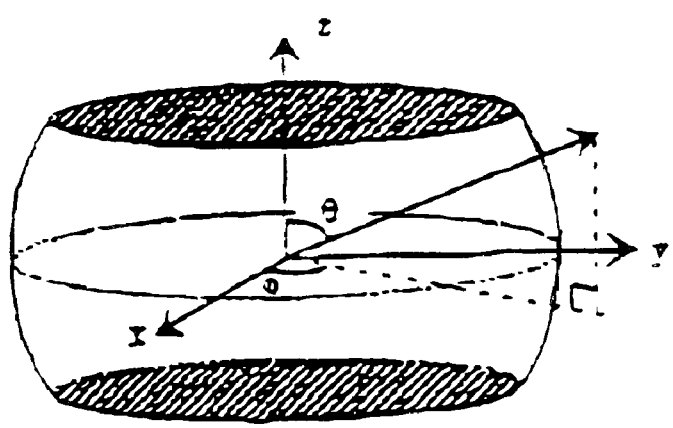
Figure 3:
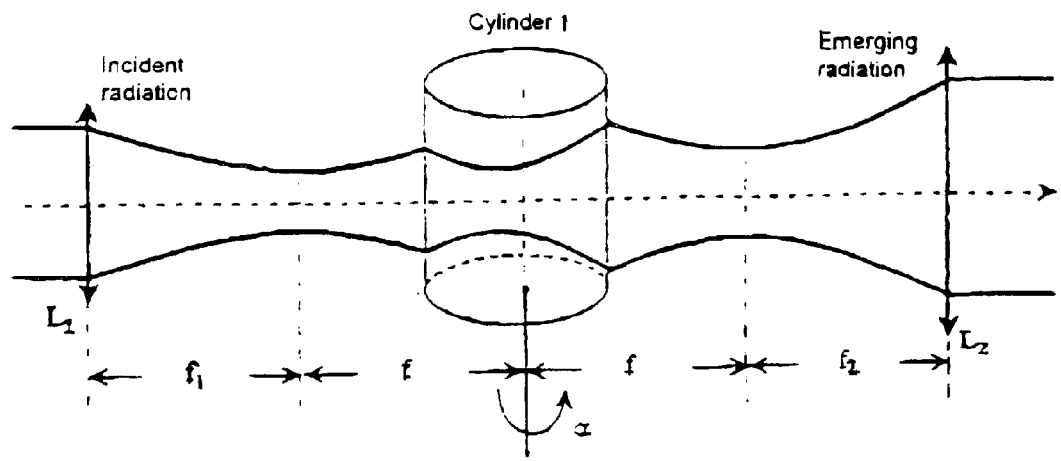
Figure 4:
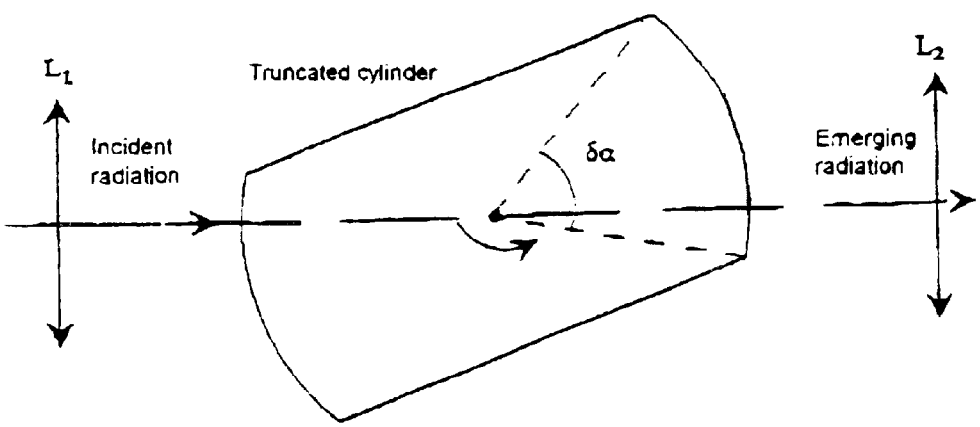
Figure 5:
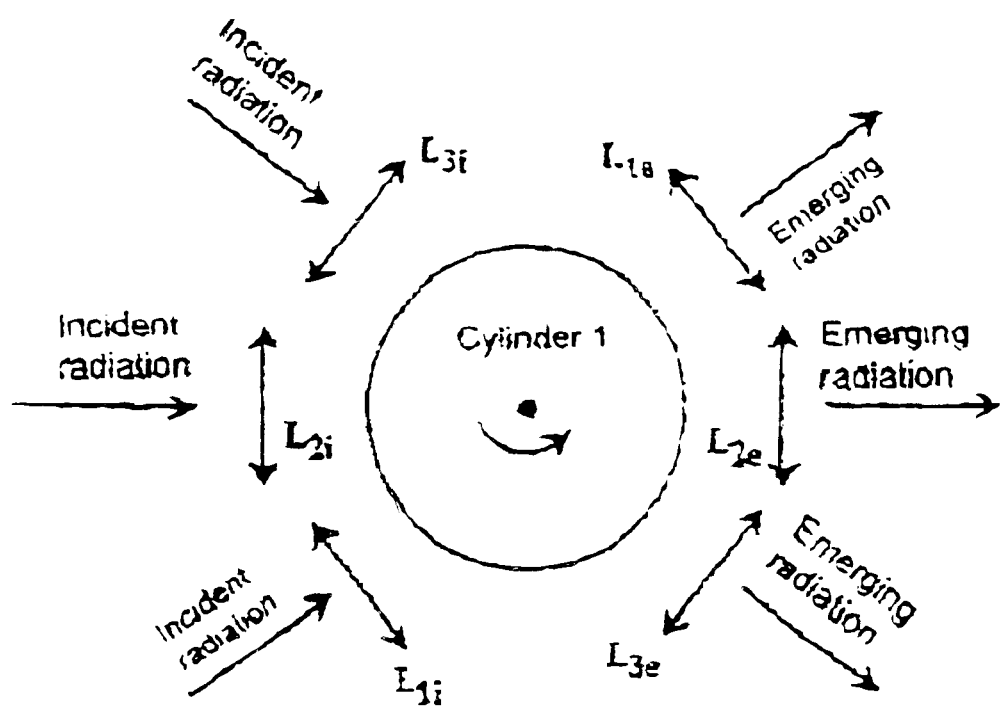
Figure 6:
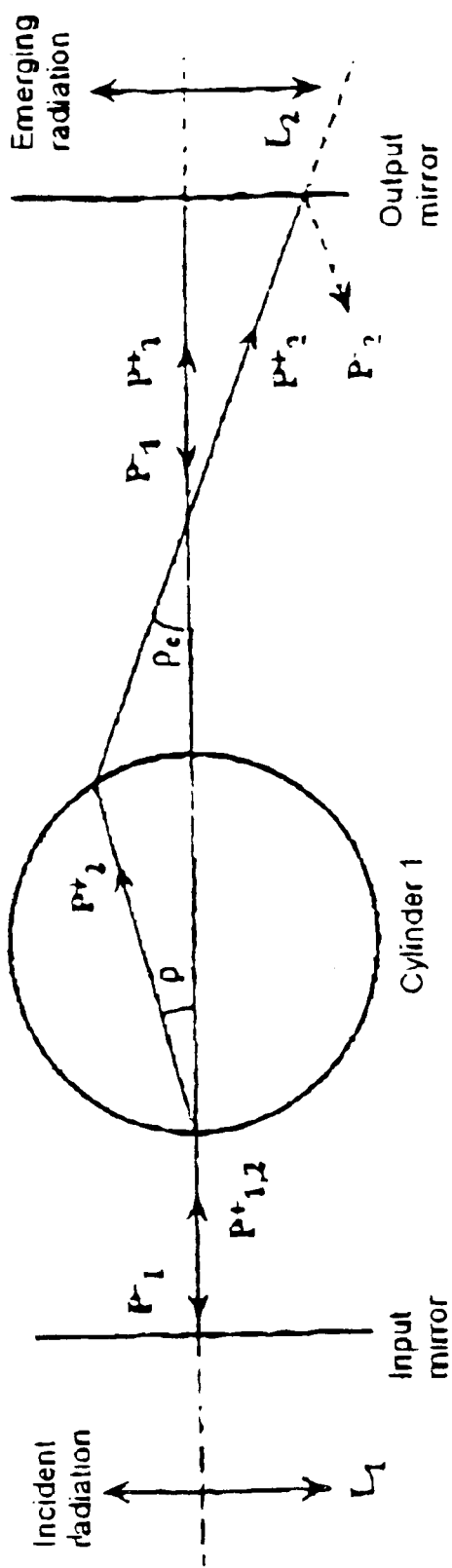
Figure 7:
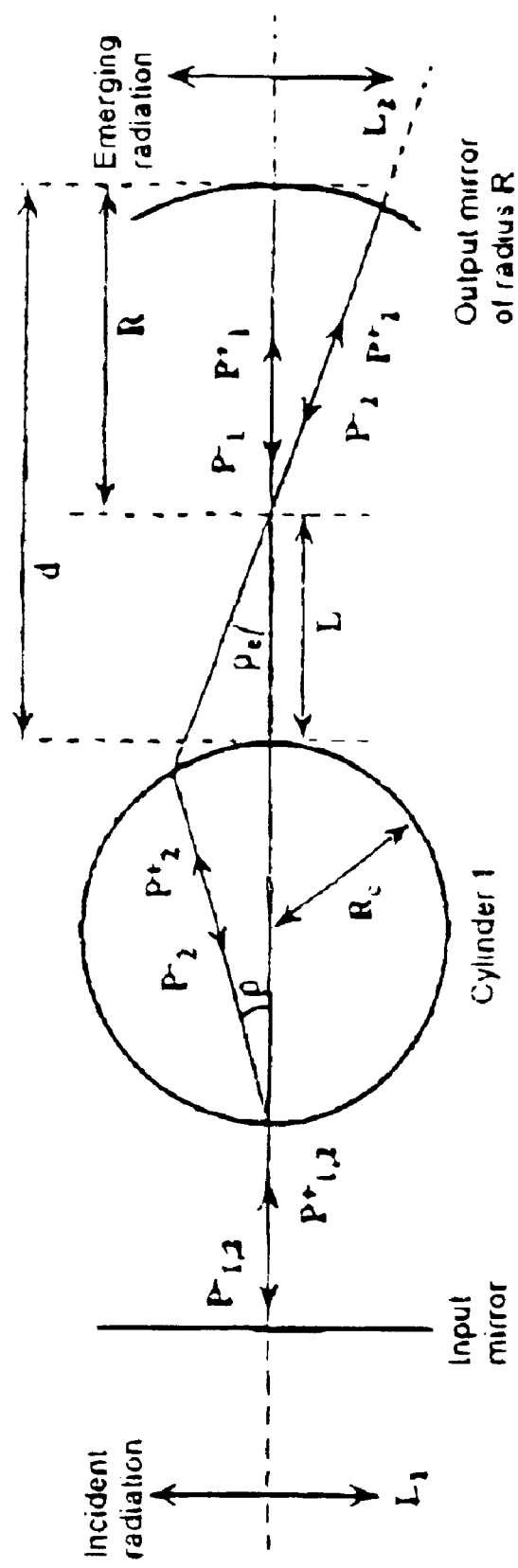
Figure 8:
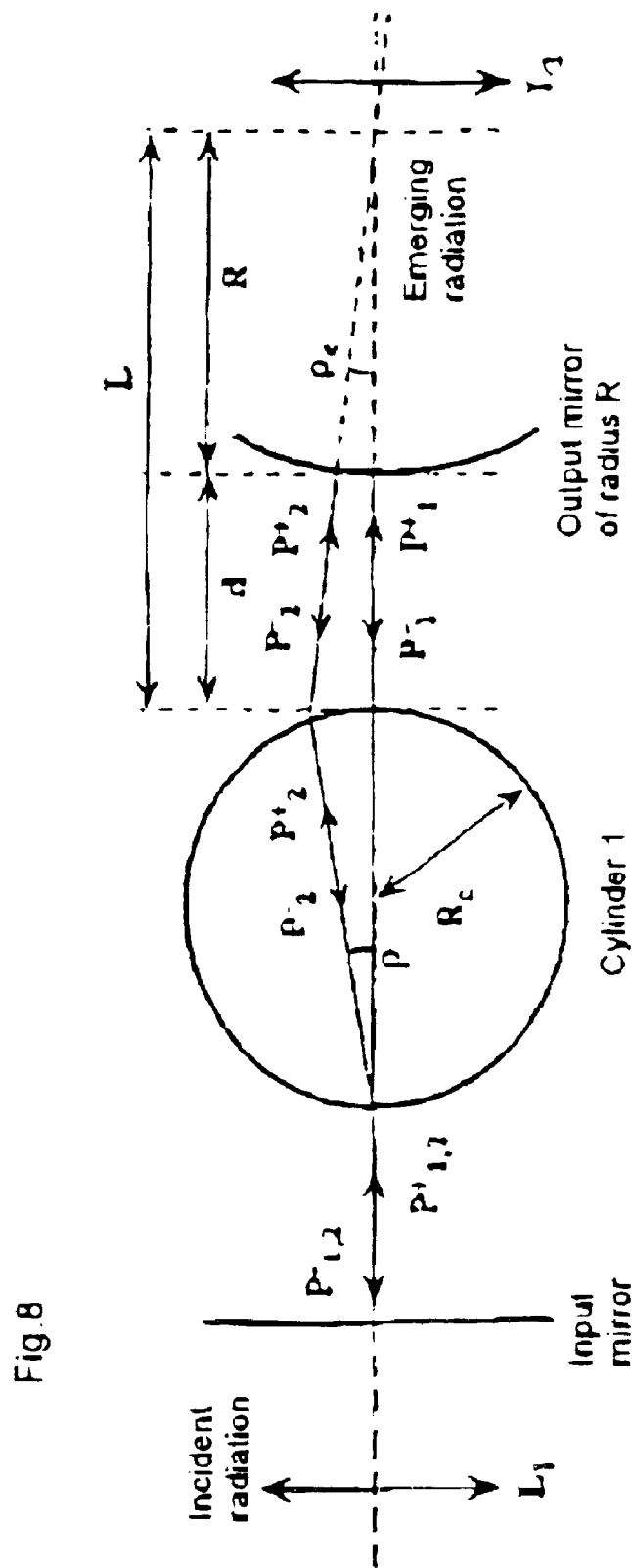
Figure 9:
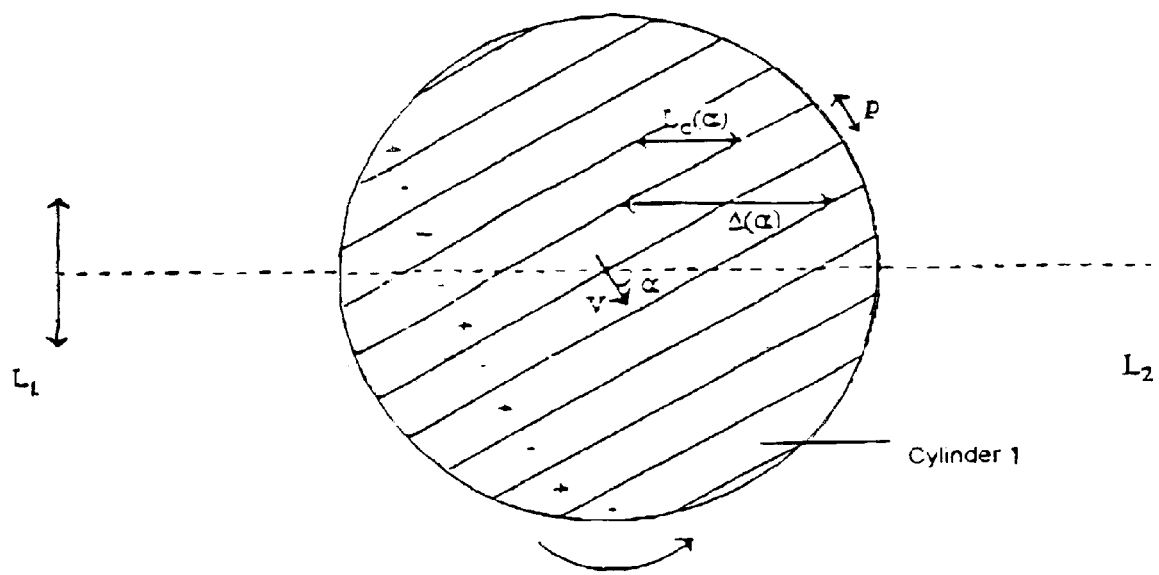
Figure 10:
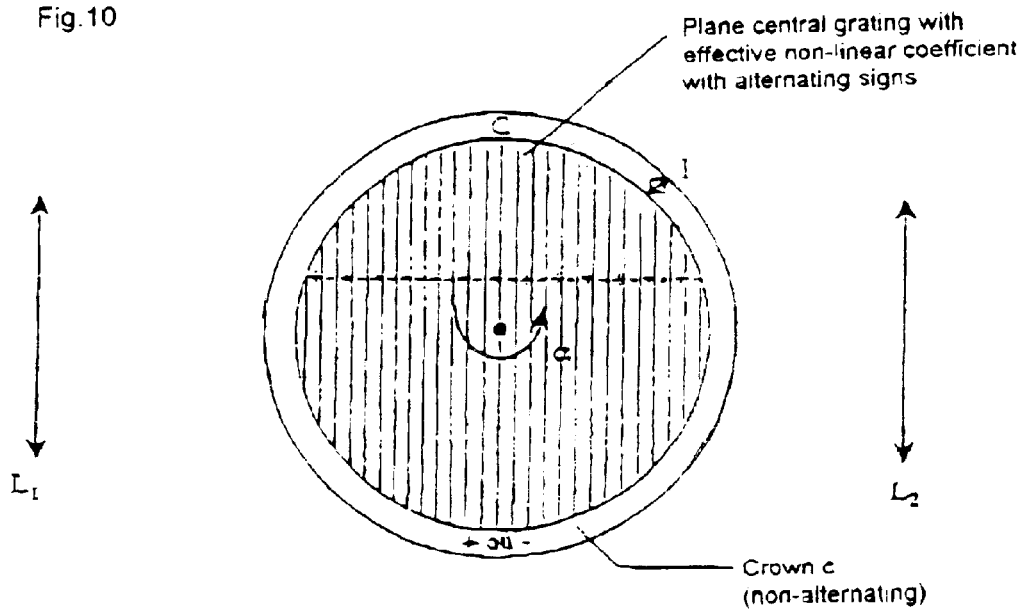
Figure 11:
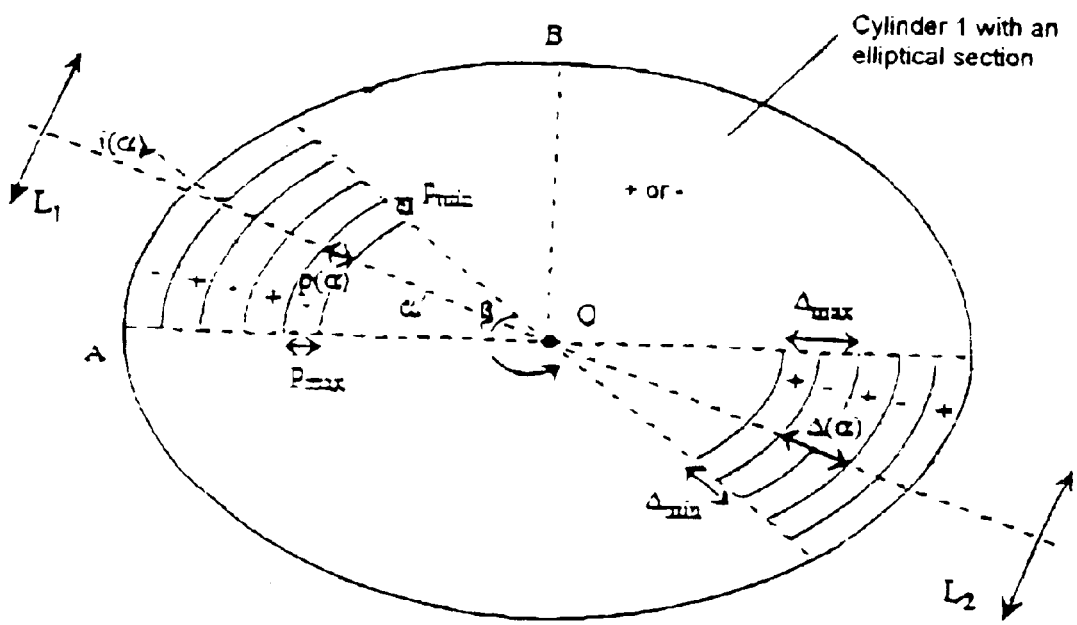
Figure 12:
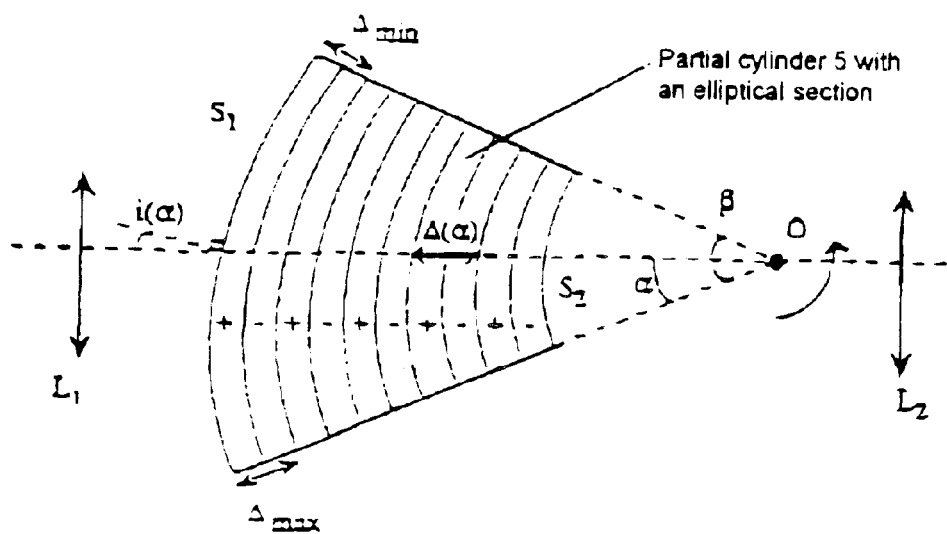
Figure 13:
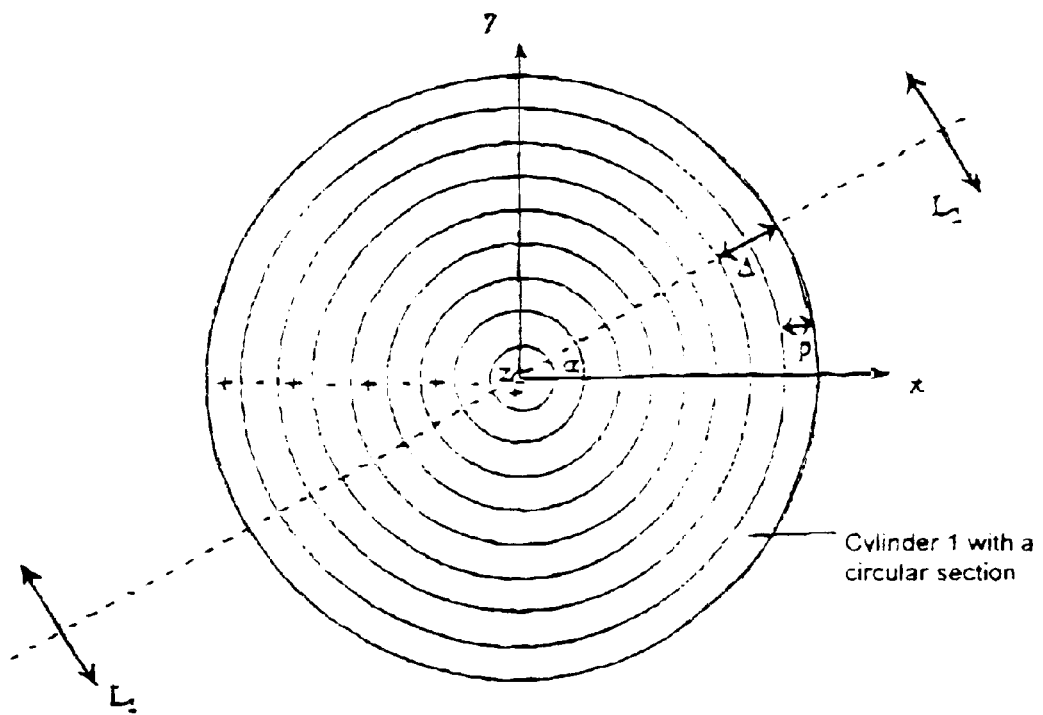

In the present application, reference is made to FIGS. 1–13:

FIG. 1 shows, on a cylindroid 2, the orthonormal axis system (x, y, z) and spherical coordinates (θ,φ) of an arbitrary direction, FIGS. 2a to 2g illustrate different embodiments 1,2,3,4,5 of a crystal belonging to the device according to the invention, the hatched surfaces represent the surfaces of said crystals on which electrodes (electro-optical effect) may advantageously be placed, each reference number 1,2,3,4,5 designates a volume which may have a circular or elliptical section, each crystal is placed between two lenses $L_1$ and $L_2$, FIG. 3 represents a device according to the invention comprising, placed between two lenses $L_1$ and $L_2$, a crystal with a non-linear optical property 1 having a completely cylindrical volume of revolution, FIG. 4 represents a device according to the invention comprising, placed between two lenses $L_1$ and $L_2$, a crystal with a non-linear optical property 3 having a cylindrical volume of revolution in a truncated way on two opposite and symmetrical quadrants of angular deviation δα (truncated cylinder), FIG. 5 represents a device according to the invention comprising, placed between three couples of lenses ($L_{1i}$, $L_{1e}$), ($L_{2i}$, $L_{2e}$), and ($L_{3i}$, $L_{3e}$), a crystal with a non-linear optical property 1 having a completely cylindrical volume of revolution, FIG. 6 represents a device according to the invention comprising a crystal with a non-linear optical property 1 placed between two lenses $L_1$ and $L_2$, and placed inside a cavity having two input and output reflecting surfaces (or mirrors) providing resonance for the wave with Poynting vectors $P_1$, FIGS. 7 and 8 represent a device according to the invention comprising a crystal with a non-linear optical property 1 placed between two lenses $L_1$ and $L_2$, and placed inside a cavity having two input and output reflecting surfaces (or mirrors) providing resonance for two waves with respective Poynting wave vectors $P_1$ and $P_2$; in FIG. 7, the input mirror is plane, the output mirror has a radius of curvature R with the concavity on the side of crystal L; in FIG. 8, the input mirror is plane, the output mirror has a radius of curvature R with the concavity on the opposite side to crystal 1, FIG. 9 represents a device according to the invention comprising, placed between two lenses $L_1$ and $L_2$, a crystal with a non-linear optical property 1 having a completely cylindrical volume of revolution and having along the direction of propagation of a sought-after interaction, an effective non-linear coefficient with alternate signs (+, −) according to the periodicity vector V and with a period Δ (periodic plane network for quasi phase tuning), FIG. 10 represents a device according to the invention comprising, placed between two lenses $L_1$ and $L_2$, a crystal with a non-linear optical property 1 with a circular section adapted to the quasi phase tuning and comprising two concentric zones: a central zone with a periodic plane network (modulation (+, −) of the sign of the effective non-linear coefficient) and a monocrystalline crown zone c for which the effective non-linear coefficient does not alternate (+ or −), FIG. 11 represents a device according to the invention comprising, placed between two lenses $L_1$ and $L_2$, a crystal with a non-linear optical property 1 with an elliptical section adapted to quasi phase tuning, and comprising an elliptical network for which the effective non-linear coefficient has an alternating sign (+, −) according to a periodicity Δ which may vary from $\Delta_{min}$ to $\Delta_{max}$ over two angular sections of aperture β, FIG. 12 represents a device according to the invention, placed between two lenses $L_1$ and $L_2$, a crystal with a non-linear optical property 5, with an elliptical section adapted to quasi phase tuning, corresponding to a portion of an ellipse of aperture β, between 0° and 180° where a network is inscribed for which the period may vary from $\Delta_{min}$ to $\Delta_{max}$, FIG. 13 represents a device according to the invention comprising, placed between two lenses $L_1$ and $L_2$, a crystal with a non-linear optical property 1 with a periodic circular network for which the refractive indexes n+ or n− vary according to the direction of propagation in a given plane.

EXAMPLES

Example 1

Calculation of the Phase Tuning Directions Through Double Refraction

Phase tuning through double refraction provides optimization of the efficiency of optical parametric interactions. In the case of crystals where the angular frequency ($\omega = 2\pi\nu$ where $\nu$ is the frequency) dispersion of refractive indexes (n) is said to be "normal", i.e., $n(\omega_1) < n(\omega_i)$ when $\omega_1 < \omega_2$, and for interactions where the wave vectors of coupled waves are colinear, the different possible phase tuning relationships are the following:

for interactions with 3 waves of angular frequencies $\omega_1$, $\omega_2$ and $\omega_3$ (with $\omega_1 + \omega_2 = \omega_3$)

$$\omega_1 n^-(\omega_1,\theta,\phi) + \omega_2 n^+(\omega_2,\theta,\phi) = \omega_3 n^+(\omega_3,\theta,\phi) \tag{1a}$$

$$\omega_1 n^+(\omega_1,\theta,\phi) + \omega_2 n^-(\omega_2,\theta,\phi) = \omega_1 n^+(\omega_3,\theta,\phi) \tag{1b}$$

$$\omega_1 n^+(\omega_1,\theta,\phi) + \omega_2 n^+(\omega_2,\theta,\phi) = \omega_1 n^+(\omega_3,\theta,\phi) \tag{1c}$$

for interaction with four waves of angular frequencies $\omega_1$, $\omega_2$, $\omega_3$ and $\omega_4$ (with $\omega_1 + \omega_2 + \omega_3 = \omega_4$)

$$\omega_1 n^+(\omega_1,\theta,\Phi) + \omega_2 n^-(\omega_2,\theta,\Phi) + \omega_3 n^-(\omega_3,\theta,\Phi) = \omega_4 n^-(\omega_4,\theta,\Phi) \tag{2a}$$

$$\omega_1 n^-(\omega_1,\theta,\Phi) + \omega_2 n^-(\omega_2,\theta,\Phi) + \omega_3 n^+(\omega_3,\theta,\Phi) = \omega_4 n^-(\omega_4,\theta,\Phi) \tag{2b}$$

$$\omega_1 n^-(\omega_1,\theta,\Phi) + \omega_2 n^+(\omega_2,\theta,\Phi) + \omega_3 n^-(\omega_3,\theta,\Phi) = \omega_4 n^-(\omega_4,\theta,\Phi) \tag{2c}$$

$$\omega_1 n^-(\omega_1,\theta,\Phi) + \omega_2 n^-(\omega_2,\theta,\Phi) + \omega_3 n^+(\omega_3,\theta,\Phi) = \omega_4 n^-(\omega_4,\theta,\Phi) \tag{2d}$$

$$\omega_1 n^+(\omega_1,\theta,\Phi) + \omega_2 n^+(\omega_2,\theta,\Phi) + \omega_3 n^-(\omega_3,\theta,\Phi) = \omega_4 n^-(\omega_4,\theta,\Phi) \tag{2e}$$

$$\omega_1 n^+(\omega_1,\theta,\Phi) + \omega_2 n^-(\omega_2,\theta,\Phi) + \omega_3 n^+(\omega_3,\theta,\Phi) = \omega_4 n^-(\omega_4,\theta,\Phi) \tag{2f}$$

$$\omega_1 n^-(\omega_1,\theta,\Phi) + \omega_2 n^+(\omega_2,\theta,\Phi) + \omega_3 n^+(\omega_3,\theta,\Phi) = \omega_4 n^-(\omega_4,\theta,\Phi) \tag{2g}$$

For interactions where the wave vectors of coupled waves are non-colinear, the combinations of refractive indexes $n^+$ and $n^-$ are identical to the colinear cases, but with different coefficients: for interactions with 3 waves, $\omega_1$ is replaced with $\omega_1 \cos[\alpha_{13},\theta,\phi]$ and $\omega_2$ is replaced with $\omega_2 \cos[\alpha_{23}(\theta,\phi)]$; for interaction with 4 waves, $\omega_2$ is replaced with $\omega_1 \cos[\alpha_{14}(\theta,\phi)]$, $\omega_2$ is replaced with $\omega_2 \cos[\alpha_{24}(\theta,\phi)]$ and $\omega_3$ is replaced with $\omega_3 \cos[\alpha_{34}(\theta,\phi)]$, with $\omega_{ij}$ the angle between the wave vectors at $\omega_1$ and $\omega_j$ (i=1 or 2 if j=3; i=1 or 2 or 3 if j=4). For example, in the case of 3-wave interactions, the projection of the vector relationships for phase tuning on the direction of the wave vector 3 transforms relationship (1a) into:

$$\omega_1 \cos[\alpha_{13}(\theta,\phi)n^+]\omega_1,\theta,\phi, +\omega_2\cos[\alpha_{23}\theta,\phi]n^+\omega_3,\theta,\phi = \omega_3 n^+(\omega_3,\theta,\phi) \tag{3}$$

where ($\alpha_{13}$) ($\alpha_{23}$) are the angles between the wave vectors at $\omega_1$ and at $\omega_3$ ($\omega_2$ and $\omega_3$), respectively. (θ, φ) are the spherical coordinates of the phase tuning direction as seen in the optical referential (x, y, z) which is bound to the non-linear crystal. FIG. 1 illustrates the configuration of axes (x, y, z) and the spherical coordinates (θ,φ) of a arbitrary direction. Section (x,y) may be circular or elliptical. Spherical coordinates (θ,φ) are related to Cartesian coordinates ($U_x$, $U_y$, $Y_z$) by:

$U_x = \cos\phi \sin\theta$; $U_y = \sin\phi \sin\theta$; $U_z = \cos\theta$ $n^+(\omega,\theta,\phi)$ and $n^-(\omega,\theta,\phi)$ are the solutions of Fresnel's equation and are given by:

$$n^\pm = \left(\frac{2}{B \pm (B^2 - 4C)^{1/2}}\right) \tag{4}$$

$B = u_x^2(b+c) - u_x^2(a+c) - u_z^2(a+b)$ $C = u_x^2 bc + u_x^2 ac + u_z^2 ab$ $a = -n_x^{-2}(\omega)$
$b = n_x^{-2}(\omega)$ $c = n_z^{-2}(\omega)$ the surface n'(θ,φ) is called the index surface. $n_x(\omega)$, $n_y(\omega)$, $n_z(\omega)$ are the main indexes of refraction at angular frequency ω. The main indexes of refraction at the angular frequencies of the interacting waves are the parameters necessary for resolving the phase tuning equations (1), (2) and (3); they are given by Sellmeier's equations with 4, 5 or 6 coefficients. Sellmeier's equations for the crystals considered hereafter in Examples 2, 3, 5 and 6 are given at room temperature here. They are determined from several measurements of refractive indexes at different wavelengths λ (λ is expressed in μm in equations (5) to (11) below).

$KTiOPO_4$:

$$n_x^2(\lambda) = 2.1239 + \frac{0.142744\,\lambda^2}{\lambda^2 - 18.477} + \frac{0.87370\,\lambda^2}{\lambda^2 - 0.045906} \quad (5)$$

$$n_y^2(\lambda) = 2.0649 + \frac{0.15529\,\lambda^2}{\lambda^2 - 19.373} + \frac{0.95463\,\lambda^2}{\lambda^2 - 0.045505}$$

$$n_z^2(\lambda) = 1.6539 + \frac{0.34767\,\lambda^2}{\lambda^2 - 29.378} + \frac{1.6482\,\lambda^2}{\lambda^2 - 0.038825}$$

$RbTiOPO_4$:

$$n_x^2(\lambda) = 2.15559 + \frac{0.93307\,\lambda^2}{\lambda^2 - 0.044075} - 0.01452\,\lambda^2 \quad (6)$$

$$n_y^2(\lambda) = 2.38494 + \frac{0.73603\,\lambda^2}{\lambda^2 - 0.057078} - 0.01583\,\lambda^2$$

$$n_z^2(\lambda) = 2.27723 + \frac{1.11030\,\lambda^2}{\lambda^2 - 0.055009} - 0.01995\,\lambda^2$$

$RbTiOAsO_4$:

$$n_x^2(\lambda) = 2.04207 + \frac{1.17785\,\lambda^2}{\lambda^2 - 0.040630} + 0.01035\,\lambda^2 \quad (7)$$

$$n_y^2(\lambda) = 2.14941 + \frac{1.09267\,\lambda^2}{\lambda^2 - 0.046062} - 0.01067\,\lambda^2$$

$$n_z^2(\lambda) = 2.18962 + \frac{1.30103\,\lambda^2}{\lambda^2 - 0.052025} - 0.01390\,\lambda^2$$

$CsTiOAsO_4$:

$$n_x^2(\lambda) = 2.34498 + \frac{1.04863\,\lambda^2}{\lambda^2 - 0.048594} - 0.01483\,\lambda^2 \quad (8)$$

$$n_y^2(\lambda) = 2.74440 + \frac{0.70733\,\lambda^2}{\lambda^2 - 0.067772} - 0.01526\,\lambda^2$$

$$n_z^2(\lambda) = 2.53666 + \frac{1.10600\,\lambda^2}{\lambda^2 - 0.062440} - 0.01711\,\lambda^2$$

$KTiOAsO_4$:

$$n_x^2(\lambda) = 2.8049 + \frac{0.35190\,\lambda^2}{\lambda^2 - 0.098915} - \frac{0.27186\,\lambda^2}{\lambda^2 + 15.798} \quad (9)$$

$$n_y^2(\lambda) = 2.8077 + \frac{0.37614\,\lambda^2}{\lambda^2 - 0.093917} - \frac{0.25531\,\lambda^2}{\lambda^2 + 8.6981}$$

$$n_z^2(\lambda) = 3.8510 + \frac{0.81874\,\lambda^2}{\lambda^2 - 86.976} - \frac{0.44017\,\lambda^2}{\lambda^2 + 28229}$$

$LiNbO_3$:

$$n_o^2(\lambda) = 4.9048 + \frac{1.11775\,\lambda^2}{\lambda^2 - 0.047533} - 0.027153\,\lambda^2 \quad (10)$$

$$n_e^2(\lambda) = 4.5820 + \frac{0.09921\,\lambda^2}{\lambda^2 - 0.044479} - 0.021940\,\lambda^2$$

$LiTaO_3$:

$$n_e^2(\lambda) = \quad (11)$$
$$4.5284 + \frac{0.0095478\,\lambda^2}{\lambda^2 - 0.060858} + \frac{0.077690\,\lambda^2}{\lambda^2 - 0.033782} - 0.023670\,\lambda^2$$

$n_o^2(\lambda)$ Not measured (not requested)

For a given interaction, characterized by the angular frequencies of the interacting waves, there is a set of phase tuning directions, i.e., couples (θ,φ) which are solutions of the same phase tuning equation. Furthermore, these different phase tuning directions are not equivalent from the point of view of the interaction efficiency. Moreover, the phase tuning directions are different from one interaction to another. Thus, an arbitrary orientation plane contains a set of phase tuning directions. The interesting planes for the present invention are in particular certain planes of symmetry of the index surface. These planes are orthogonal to the axis of revolution of the cylinder.

For a uniaxial crystal, defined by $n_x=n_y=n_z$, the useful planes are the orthogonal planes to plane (xy), i.e., at constant φ angle: each of these planes contains phase tuning directions which are symmetrical two by two with respect to the z axis, and each of these couples corresponds to a particular interaction. The different planes, corresponding to different φ values, have the same phase tuning spectral range but are distinguished by the interaction efficiency.

For a biaxial crystal, defined by $n_x \neq n_y = n_z$, the three main planes (xy), (xz) and (yz) are of interest. Plane (xy) contains the phase tuning directions which are symmetrical two by two with respect to x and y, each of the couples corresponding to a specific interaction. Planes (xz) and (yz) have the same symmetry than the planes of an uniaxial crystal containing the z axis as described earlier. The three planes (xy), (xz) and (yz) of the biaxial crystal do not have the same phase tuning spectral ranges.

Example 2

Forms of the Non-Linear Crystal

FIGS. 2a to 2g illustrate various embodiments of a crystal belonging to the device according to the invention, the hatched surfaces represent surfaces of said crystal on which electrodes may be advantageously placed (for the electro-optical effect). Reference numbers 1 and 2, each refer to a crystal with a non-linear optical property having a completely cylindrical volume of revolution (reference 1: cylinder; reference 2; cylindroid), reference 3 and 4 refer to a crystal with a non-linear optical property having a cylindrical volume of revolution in a truncated way on opposite and symmetrical quadrants with respect to its axis of revolution, (reference 3: truncated cylinder; reference 4: truncated cylindroid), reference 5 refers to a crystal with a non-linear optical property corresponding to a portion of said volumes 1 or 2 along planes containing the axis of revolution (reference 5: partial cylinder or cylindroid). Said volumes of cylinder 1 and cylindroid 2 may have a circular section or an elliptical section; such a section may notably be considered along an orthogonal plane to the axis of revolution. Electrodes may be advantageously placed on both sides of a crystal according to different configurations, which are illustrated in FIGS. 2a to 2g by a pair of hatched surfaces. For the crystals of volume 3 or 4, two of these configurations are illustrated: a pair of horizontally orientated electrodes or a pair of vertically orientated electrodes.

Example 3

Configuration and Geometry of the Components for Focussing and Collecting Radiation The incident radiation(s) are focussed on the crystal by one or more lenses or by a mirror with a concavity orientated on the side of said crystal or by a mirror with a concavity orientated on the opposite side of said crystal. The emerging radiation(s) are collected by one or more lenses or by a mirror with a concavity orientated on the side of said crystal or by a mirror with a concavity orientated on the opposite side of said crystal, regardless of the focussing device.

The focal distance of the focussing device is such that the incident radiation(s) have a small dimension with respect to the radius of the crystal in order to limit optical aberrations and for increasing the interaction efficiency, and such that this dimension is sufficient for preventing any damage to the crystal by a too strong incident intensity. The focal distance of the device collecting the emerging radiation is such that the divergence of this emerging radiation is minimum.

These focal distances are between about 50 and 500 mm. FIGS. 3 and 4 illustrate the realization of a device according to the invention where only one incident radiation is focused on the crystal. FIG. 3 represents a device according to the invention comprising a crystal with a non-linear optical property 1, having a completely cylindrical volume of revolution and a focal distance f. This crystal is capable of rotating by an angle $\alpha$ which may range from 0° to 360°. It is placed between two lenses $L_1$ and $L_2$ with focal distances $f_1$ and $f_2$, respectively.

FIG. 4 represents a device according to the invention comprising, placed between two lenses $L_1$ and $L_2$, a crystal with a non-linear optical property 3, having a cylindrical volume of revolution in a truncated way on two opposite and symmetrical quadrants of angular deviation $\Delta\alpha$.

FIG 5 illustrates the realization of a device according to the invention where three incident radiations are focused on the crystal. The crystal with a non-linear optical property 1 has a completely cylindrical volume of revolution. It is placed between 6 convergent lenses: $L_{1i}$, $L_{2i}$, $L_{3i}$ are the lenses used for focusing the different incident radiations. $L_{1e}$, $L_{2e}$, $L_{3e}$ are the lenses used for collecting the different emerging radiations.

Example 4

General Calculation of a Cavity

In the case of resonant interactions, the crystal is placed inside a cavity. The geometry of the cavity, the radius of curvature of mirrors R and distances separating the mirrors of crystal d, is defined according to the specific refraction properties of cylindrical diopters of crystal with anisotropic optical properties, in particular as regards the angle $\rho$ for double refraction, the angle between the Poynting vector (the beam) and the wave vector (the wave). The reflection coefficients of the input and output mirrors are such that the cavity may be resonant either with one or two or three or four interacting wave(s).

The mirror receiving the incident radiation, called the oscillation threshold and the stability to optimize the oscillation threshold and the stability of the cavity, the input mirror may have a suitable radius of curvature (for example a spherical, cylindrical or parabolic mirror), with the concavity on the side of the non-linear crystal or on the opposite side of the non-linear crystal.

If the resonant waves have zero double refraction angle, the mirror receiving the emerging radiation, called the output mirror, may be plane as is shown in FIG. 6.

FIG. 6, illustrates a device according to the invention comprising a crystal with a non-linear optical property 1 placed between two lenses $L_1$ and $L_2$, and placed inside a cavity having two input and output reflecting surfaces (or mirrors) providing resonance of the wave, for which the Poynting vector is $P_1$. The lenses are placed on the outside of the cavity. The diagram of FIG. 6 only shows two types of beams: the resonant beam represented by the Poynting vector $P_1$, for which angle $\rho$ is zero, and the non resonant beam represented by the Poynting vector $P_2$, with non-zero $\rho$. The wave vector associated with $P_1$ and $P_2$, are collinear with $P_1$. Only one round trip in the cavity is illustrated:— direction for the outward travel,—direction for the return. In order to optimize the oscillation threshold and the stability of the cavity, the output mirror may have a suitable radius of curvature (for example a spherical, cylindrical or parabolic mirror) with the concavity on the side of the non-linear crystal or with the concavity orientated on the opposite side of the non-linear crystal.

If at least one of the resonant waves at a non-zero double refraction angle $\rho$, the output mirror is spherical or cylindrical with radius R. The selection of the orientation, with respect to the crystal and the magnitude of the radius of curvature R as well as the distance d separating the crystal from the output mirror depends on the geometrical parameter L in such a way that the outgoing and returning beams of the resonant wave coincide as shown in FIGS. 7 and 8.

FIGS. 7 and 8 actually represent a device according to the invention comprising a crystal with a non-linear optical property 1 placed between two lenses $L_1$ and $L_2$, and placed inside a cavity having two input and output reflecting surfaces (or mirror) providing resonance of two waves with their wave vectors colinear with $P_1$, represented by their respective Poynting vectors $P_1$ and $P_2$, with $P_1$ being resonant or non-resonant, and such that the corresponding double refraction angle $\rho$ is zero, with $P_1$ resonant such that the corresponding double refraction angle $\rho$ is non-zero. The lenses are placed outside the cavity. In FIG. 7, the input mirror is plane, the output mirror has a radius of curvature R with the concavity on the side of the crystal 1; in FIG. 8, the input mirror is plane, the output mirror has a radius of curvature R with the concavity on the opposite side to crystal 1.

Parameter L is defined by:

$$L = R_c \left[ \cos 2\rho + \frac{\sin 2\rho}{\tan \rho_c} - 1 \right] \quad (12)$$

avec $\rho$=arcsin ($n$ sin 2$\rho$)−2$\rho$ (13)

n is the index of refraction of the resonant wave for which angle $\rho$ is non-zero.

FIGS. 7 and 8 only show two types of beams: beam $P_1$, either resonant or not, the polarization of which is such that angle $\rho$ is zero and beam $P_2$, resonant, with non-zero $\rho$. The wave vectors associated with $P_1$ and $P_2$, are collinear with $P_1$. Only one round trip is illustrated in the cavity: + direction for the outward travel, − direction for the return.

FIG. 7 concerns an output mirror, the concavity of which is orientated on the side of the crystal. For a given d value, the radius of curvature R is defined by:

$$R = d - L \text{ with } d > L \quad (14)$$

L is given by relationships (12) and (13).

FIG. 8 concerns an output mirror with the concavity orientated on the opposite side of the crystal.

For a given d value, the radius of curvature R is defined by:

$$R = L - d \text{ with } d < L \quad (15)$$

L is given by relationships (12) and 13).

The ratio $L/R_0$ is constant to within $10^{-1}$ for values of $\rho$ between 0° and 2°, which may be used for values for most of the crystals which may be used for parametric interactions. The variation of $L/R_0$ is of the order of $10^{-2}$ when $\rho$ varies from 2° to 3°. Thus, for these cases with a large double refraction angle, the paths of the outgoing and returning beams coincide if the output mirror has a suitable curvature, is non-spherical, and non-cylindrical, this takes into account the values of L and ρ corresponding to the spectral range used; such a mirror may be used in order to optimize the stability and the oscillation threshold of the cavity.

For a mirror with a given radius of curvature R, the configuration according to FIG. 8 may only be contemplated of the radius of the cylinder is greater than a minimum value.

$$R_c > \frac{R}{\cos 2\rho + \frac{\sin 2\rho}{\tan \rho_c} - 1} \quad (16)$$

Such that d (=L−R) is positive.

When both configurations of FIGS. 7 and 8 may be contemplated, the case of FIG. 8 leads to a shorter total length of the cavity ($2R_c+L$ for two input and output mirrors with the same radius of curvature) than for the configuration of FIG. 7 ($2R_c+L+2R$). For radiations with short time pulses, a cavity with a small length provides a more efficient conversion.

Example 5

Phase Tuned Optical Parametric Oscillator (OPO), by Double Refraction

In the case of an interaction with three waves of respective angular frequencies $\omega_1$, $\omega_2$ and $\omega_3$ with $\omega_3=\omega_1+\omega_2$, the incident laser radiation, called the "pump" has a wavelength of $\lambda_p=2\pi c/\omega_3$, where in c is the speed of light in vacuo, $\omega_3$ is the largest of the thee angular frequencies of the interacting waves. The two angular frequencies of the waves emitted in the OPO are called "signal" and "complementary", with respective wavelengths $\lambda_s=2\pi c/\omega_2$, and $\lambda_1=2\pi c/\omega_1$, such that $\omega_1-\omega_2=\omega_3$, and $\omega_1<\omega_2$. Table 1 below gives for $\lambda_p=0.532 \mu m$ and $\lambda_p=1.064 \mu m$, the range of wavelengths of the signal $\Delta\lambda_s$ and of the complementary $\Delta\lambda_1$, which may be generated with phase tuning by double refraction for a total rotation of $\Delta\alpha$, from the phase tuning minimum angle $\alpha_{min}$ for cylinders of several crystals with non-linear optical properties: $KTiOPO_4$ (KTP), $CsTiOAsO_4$ (CTA), $RbTiOPO_4$ (RTP), $RbTiOAsO_4$ (RTA), $KTiOAsO_4$ (KTA), $LiNbO_3$. The axis of revolution, X, Y or Z, is an axis of the optical reference system, as defined in Example 1. For a rotation around the Z axis, α is the angle φ in spherical coordinates; for a rotation around aces Y or X, α corresponds to the angle θ in spherical coordinates, $\Delta\alpha$ and $\alpha_{min}$ are calculated from the phase tuning relationships and Sellmeier's equations from Example 1.

Each crystal, machined into a complete cylinder 1, into a truncated cylinder 3 or into a partial cylinder 5 (cf. FIG. 2) is placed inside a resonant cavity such as defined above in Example 1 (lenses outside the cavity).

TABLE 1

| Crystal | λp (μm) | Δλs (μm) | Δλi (μm) | Axis of rotation of the cylinder | Angle of rotation Δα (°) | αmin (°) |
|---|---|---|---|---|---|---|
| KTiOPO₄ | 0.532 (−) | 0.62–1.04 (+) | 1.09–3.5 (−) | Y | 46 | 44 |
| KTiOPO₄ | 1.064 (−) | 1.53–2.12 (+) | 2.13–3.5 (−) | Y | 7 | 45.5 |
| CsTiOAsO₄ | 0.532 (−) | 0.59–0.74 (+) | 1.9–5.2 (−) | Y | 39 | 51 |
| CsTiOAsO₄ | 1.064 (−) | 1.33–2.12 (+) | 2.13–5.2 (−) | Y | 15 | 51.5 |
| RbTiAsO₄ | 0.532 (−) | 0.59–0.355 (+) | 1.41–5.2 (−) | Y | 49 | 41 |
| RbTiAsO₄ | 1.064 (−) | 1.33–2.12 (+) | 2.13–5.2 (−) | Y | 9.3 | 44.5 |
| RbTiOPO₄ | 0.532 (−) | 0.62–0.95 (+) | 1.21–3.5 (−) | Y | 45 | 45 |
| RbTiOPO₄ | 1.064 (−) | 1.52–2.12 (+) | 2.13–3.5 (−) | Y | 3.3 | 49.5 |
| LiNbO₄ | 0.532 (−) | 0.59–0.70 (+) | 2.2–5.2 (−) | Y (or X) | 40 | 50 |
| LiNbO₄ | 1.054 (−) | 1.33–2.12 (+) | 2.13–5.2 (−) | Y (or X) | 21 | 57 |
| KTiOPO₄ | 0.532 (−) | 0.95–1.16 (−) | 1.06–1.2 (−) | Z | 57 | 23 |
| KTiOPO₄ | 1.064 (−) | 1.52–1.53 (−) | 3.25–3.5 (−) | Z | 90 | 0 |
| CsTiOAsO₄ | 0.532 (−) | 0.74–0.84 (−) | 1.45–1.9 (−) | Z | 90 | 0 |
| CsTiOAsO₄ | 1.064 (−) | 1.7–2.0 (−) | 2.27–2.8 (−) | Z | 90 | 0 |
| RbTiOPO₄ | 0.532 | 0.855–0.955 (−) | 1.2–1.41 (−) | Z | 90 | 0 |
| RbTiOPO₄ | 1.054 (−) | 1.54–1.01 (−) | 3.15–3.4 (+) | Z | 90 | 0 |
| RbTiAsO₄ | 0.532 (−) | 0.95–1.06 (−) | 1.06–1.22 (−) | Z | 60 | 0 |
| RbTiAsO₄ | 1.064 (−) | 1.61–1.69 (−) | 2.35–3.15 (+) | Z | 90 | 0 |
| KTiOAsO₄ | 0.532 (−) | 0.96–1.04 (+) | 1.09–1.19 (+) | Z | 90 | 0 |
| KTiOAsO₄ | 1.064 (−) | 1.55–1.60 (−) | 3.15–3.38 (+) | Z | 90 | 0 |

(+) and (−) refer to indexes of refraction $n^+$ and $n^-$ defined in Example 1, which are involved in the phase tuning relationship.

The case of a tunable OPO in the range 1.4 μm–5.2 μm for applications in infrared spectroscopy is detailed hereafter. The pump laser emits radiation at 0.532 μm (a YAG-Nd laser with doubled frequency). A crystal of $PbTiOAsO_2$ is machined into a partial cylinder 3 (cf. FIG. 2) with optically polished cylindrical faces. The axis of revolution is borne by axis Y (identical with the crystallographic axis b. The extreme directions of the cylindrical portion are axis X (identical to the crystallographic axis a) on the one hand and the direction (φ=0°, θ=41°) on the other hand. Rotation of the crystal is performed around axis Y between these two extreme directions by means of a motor-driven micrometric rotary device secured to the crystal.

The radius of the cylindrical portion is $R_2=10$ mm. The crystal is placed between two cylindrical mirrors with radius of curvature R=10 mm. A mirror is totally reflecting for wavelengths from 0.59 μm to 0.85 μm, the second mirror has a large reflection coefficient (R=90%) for the same wavelength. The mirrors are positioned according to the layout described in FIG. 8. The total length of the cavity is 32.5 mm with L=12.5 mm and d=2.5 mm. If the mirrors are positioned according to the layout described in FIG. 7, the total length of the cavity is 52.5 mm with L=12.5 mm and d=22.5 mm.

Example 6

Phase Tuned Second Harmonic Generator (GSH) by Double refraction

In the case of an interaction with 3 waves of respective angular frequencies $\omega_1$, $\omega_2$ and $\omega_3$, with $\omega_3=\omega_{1+\omega_2}$, the incident so-called "pump" radiation has a wavelength of $\lambda_p=2\pi c/\omega$, with $\omega=\omega_1=\omega_2$. The angular frequency of the emitted waves in the GSH is the second harmonic of the pump wave, i.e., a wavelength $\lambda_h=2\pi c/2\omega$, with $2\omega=\omega_3$. Table 2 gives for a total rotation of $\delta\alpha=90°$, the range of pump wavelengths $\Delta\lambda_p$ for which phase tuning by double refraction of the GSH is possible in cylinders of several crystals with non-linear optical properties: $KTiOPO_4$ (KTP), $RbTiOAsO_4$ (RTA), $CsTiOAsO_4$ (CTA), $RbTiOPO_4$ (RTP), and $KTiOAsO_4$ (KTA). Rotation is performed around the Z axis of these crystals (the crystallographic axis c which is the binary axis), from one of the X or Y axes. The calculations are carried out from the phase tuning relationships 1b (equivalent to 1c in the case of GSH) of Example 1. Each crystal, machined into a complete cylinder 1, into a truncated cylinder 3 or into a partial cylinder 5 (cf. FIG. 2) is placed outside or inside a cavity as defined in Example 4 above.

TABLE 2

| Crystal | $\Delta\lambda_i$ ($\mu$m) |
| --- | --- |
| $KTiOPO_4$ | 0.99–1.08 |
| $RbTiOAsO_4$ | 1.14–1.25 |
| $CsTiOAsO_4$ | 1.27–1.55 |
| $RbTiOPO_4$ | 1.04–1.15 |
| $KTiOAsO_4$ | 1.08–1.15 |

The case of a cylinder of $CsTiOAsO_4$ is detailed hereafter. It is very difficult to obtain spectrally refined radiation between 0.5 $\mu$m and 0.7 $\mu$m with conventional OPOs. For applications in spectroscopy in this wavelength domain, doubling the frequency of the radiation emitted between 1 $\mu$m and 1.4 $\mu$m by an OPO is contemplated. A crystal of $CsTiOAsC_4$ machined into a partial cylinder 3 (cf. FIG. 2) with the binary Z axis (crystallographic c axis) as axis of revolution is fixed on a motor-driven micrometric rotary support. The cylindrical face of the crystal is optically polished. The incident radiation, emitted between 1.27 $\mu$m and 1.55 $\mu$m by a OPO, is focused by a convergent lens with focal length 100 mm (placed outside the cavity) into the crystal of radius R=5 mm. The emerging radiation is collected with a second lens with identical focal length, also placed outside the cavity as shown in Example 4. With a complete rotation of 90° between the X and Y axes, harmonic radiation between 0.63 $\mu$m and 0.77 $\mu$m may be generated efficiently because of the double refraction angles which are always small for the considered phase tuning direction.

Example 7

Quasi-phase Tuning: Calculation of the Coherence Length

The advantage of the quasi-phase tuning is notably that it may be achieved for combinations of any $n^+$ or $n^-$ solutions with the angular frequencies of the interacting waves. $n^\pm$ are given by the relationships (4) from Example 1.

The coherence length $L_c$ of the parametric interactions in the crystals with the periodically alternating structure from Examples 9 and 10 is given by the following relationship in the case of an interaction with three waves of angular frequencies $\omega_1$, $\omega_2$ and $\omega_3$:

$$L_c = \frac{\pi c}{\omega_1 n(\omega_1) - [\omega_1 n(\omega_1) + \omega_2 n(\omega_2)]} \quad (17)$$

n is calculated from the Sellmeier equations given in Example 1. In a structure with period 2Lc, the frequency conversion interaction is quasi phase tuned when the indexes of refraction of the interacting waves $n(\omega_1)$, $(n\omega_2)$ and $(\omega_3)$ satisfy the relationship (17).

Example 8

Calculation of the Variation of the Coherence Length as a Function of the Angle of Rotation of the Crystal in the Case of a Periodic Plane Network FIG. 9 represents a device according to the invention comprising, placed between two lenses $L_1$ and $L_2$, a crystal with a non-linear optical property 1 having a completely cylindrical volume of revolution, capable of rotating by an angle which may range from 0 to 360° and having an effective non-linear coefficient with alternating signs (+, –) according to the periodicity vector V. p is the width of each monocrystalline domain of the network along V. As the laser radiation is considered fixed, the coherence length along the propagation direction is a function of the angle of rotation $\alpha$. It is given by the following relationship:

$$L_c(\alpha) = \frac{p}{\cos\alpha} \quad (18)$$

The periodicity of the network therefore varies in function of $\alpha$ according to the following relationship:

$$\Delta\alpha = 2 \times L_c(\alpha) \quad (19)$$

Thus, to each angle $\alpha$ corresponds a particular parametric interaction ($\omega_1$, $\omega_2$, $\omega_3$) such as $L_c$ ($\alpha$) is equal to an odd multiple of the coherence length of this interaction. The tenability of the parametric device is thus achieved. The symmetry of the periodic structure is such that a total rotation of $\delta\alpha=90°$ enables access to all the periodicities: $\Delta(\alpha=0°)=2p$ to $\Delta(\alpha=90°)\to\infty$. Thus, a cylindrical volume of revolution described in a truncated way 3 (cf. FIG. 2) or in a partial way (portion 5 of the cylinder) may also be used in this case. The same argument is also valid for a volume of a cylindroid 2 with respect to a volume of a truncated cylindroid 4, and a volume 5 of a partial cylindroid. This also applies whether the (xy) section is circular or elliptical.

Example 9

Quasi Chase Tuned Optical Parametric Oscillator (OPO)

In the case of an interaction with 3 waves of respective angular frequencies $\omega_1$, $\omega_2$ and $\omega_3$ with $\omega_1=\omega_1+\omega_2$, the so-called "pump" incident laser radiation has a wavelength of $\lambda_p=2\pi c/\omega_3$, wherein c is the speed of light in vacuo and $\omega_3$ is the largest of the three angular frequencies of the interacting waves. The two angular frequencies of the waves emitted in the OPO are called "signal" and "complementary", with respective wavelength $\lambda_3=2\pi c/\omega_3$, $\lambda_1=2\pi c/\omega_1$, such that $\omega_1+\omega_2=\omega_3$ with $\omega_1<\omega_2$. Table 3 below gives for $\lambda_p=0.532$ μm and $\lambda_2=1.064$ μm, the range of wavelengths for the signal and the complementary, respectively $\Delta\lambda_n$ and $\Delta\lambda_1$, which may be generated, quasi phase tuned for a total rotation of $\delta\alpha$ of the cylinder of several crystals with non-linear optical properties, $KTiOPO_4$, $CsTiOAsO_4$, $RbTiOAsO_4$, $LiNbO_3$, $LiTaO_3$, $RbTiOPO_4$, and $KTiOAsC_4$, wherein the effective coefficient's sign periodically alternates over a coherence length $L_c$ (cf. FIG. 9). The domains are inverted along the polar axis of the crystals which corresponds to the axis of revolution of the cylinder in accordance with what is described in Examples 7 and 8 above. The angle of rotation is located with respect to the periodicity vector of the network V. The relevant interaction relates to 3 polarized waves along the polar axis. The calculations are carried out from the relationship (17) of Example 7 and from Sellmeier's equations from Example 1.

Each crystal, machined into a complete cylinder 1 or into a truncated cylinder 3 or into a portion 5 of a cylinder (cf. FIG. 2), is placed in a resonant cavity such as defined earlier in Example 1. As the three interacting waves have a zero angle of refraction, the input and output mirrors of the cavity may be plane.

TABLE 3

| Material | $\lambda p$ μm | $\Delta\lambda s$ μm | $\Delta\lambda i$ μm | Pitch of the grating | Maximum angle of rotation $\delta\alpha$ (°) |
|---|---|---|---|---|---|
| $KTiOPO_4$ | 0.532 | 0.52–1.05 | 1.06–3.5 | 9.3 | 50 |
| $KTiOPO_4$ | 1.064 | 1.52–2.12 | 2.13–3.5 | 36.5 | 23 |
| $RbTiOAsO_4$ | 0.532 | 0.59–1.06 | 1.06–5.2 | 15.6 | 57 |
| $RbTiOAsO_4$ | 1.064 | 1.33–2.12 | 2.13–5.2 | 34.8 | 34 |
| $RbTiOPO_4$ | 0.532 | 0.62–1.06 | 1.06–3.5 | 8.8 | 49 |
| $RbTiOPO_4$ | 1.064 | 1.52–2.12 | 2.13–3.5 | 32 | 25 |
| $LiNbO_3$ | 0.532 | 0.59–1.06 | 1.06–5.2 | 6.4 | 56 |
| $LiNbO_3$ | 1.064 | 1.33–2.12 | 2.13–5.2 | 25.7 | 35 |
| $CsTiOAsO_4$ | 0.532 | 0.59–1.05 | 1.06–5.2 | 2.9 | 55 |
| $CsTiOAsO_4$ | 1.164 | 1.33–2.12 | 2.13–5.2 | 30 | 38 |
| $KTiOAsO_4$ | 0.532 | 0.59–1.06 | 1.06–5.2 | 8.5 | 55 |
| $KTiOAsO_4$ | 1.064 | 1.33–2.12 | 2.13–5.2 | 28.5 | 36 |

The case of a tunable OPO between 3 μm and 5 μm for applications in optronic counter-measures is detailed hereafter. A structure of $LiNbO_3$ with alternating ferroelectric domains with periodicity 26.26 μm is machined into a truncated cylinder 3 (cf. FIG. 2), with optically polished cylindrical phases. The axis of rotation of the cylinder is the binary Z axis to which the ferroelectric domains are parallel. The periodicity vector V of the structure is perpendicular to this axis and is one of the extreme directions of the cylindrical portion. The other extreme direction of the cylindrical portion is located at 40.5° from the first. The structure is fixed on a motor-driven micrometric rotary support. The portion of the cylinder has a radius R=13 mm and a thickness of 1 mm. It is placed at the center of a cavity formed with tow cylindrical mirrors with a radius of curvature R=15 mm, the concavity of which is orientated on the side of the crystal. The first mirror is totally reflecting for wavelengths between 1.35 μm and 1.55 μm, the second mirror has a reflection coefficient R=90% for these same radiations. The total length of the cavity is 30 mm. The pump laser radiation is emitted at 1.064 μm by a YAG:Nd laser. Two lenses with focal length f=100 mm are placed on both sides of the cavity in order to focus the incident radiation and to collect the emerging radiation.

Example 10

Generator of a Quasi-phase Tuned Second Harmonic (GSH)

In the case of an interaction with 3 waves of respective angular frequencies $\omega_1$, $\omega_2$ and $\omega_3$ with $\omega_3=\omega_1+\omega_2$, the so-called "pump" incident radiation has a wavelength of $\lambda_p=2\pi c/\omega$, with $\omega=\omega_1=\omega_2$. The angular frequency of the waves emitted in the GSH is the second harmonic of the pump wave, i.e. a wavelength of $\lambda_G=2\pi c/2\omega$, with $2\omega=\omega_3=\omega_2$. Table 4 below gives the range of pump wavelengths $\Delta\lambda_p$ corresponding to a total rotation of $\delta\alpha$, for which quasi phase tuning of the GSH is possible in cylinders of several crystals with non-linear optical properties, $KTiOPO_4$, $RbTiOAsC_4$, $CsTiOASO_4$, $TbTiOPO_4$, $KTiOAsO_4$, $LiNbO_3$, and $LiTaO_3$, the effective coefficient's sign periodically alternates over a coherence length $L_c$ (cf. FIG. 9). The domains are inverted along the pole axis of the crystals which corresponds to the axis of revolution of the cylinder in accordance with what is described in Examples 7 and 8 above. The angle of rotation is located with respect to the periodicity vector V of the network. The relevant interaction relates to 3 polarized waves along the polar axis. The calculations are carried out from the relationship (17) of Example 7 and from the Sellmeier equations of Example 1.

Each crystal, machined into a complete cylinder 1 or into a truncated cylinder 3 or into a portion 5 of a cylinder (cf. FIG. 2), is placed either outside or inside a cavity such as defined above in Example 4. FIG. 6 illustrates such a device when the crystal is placed inside such a cavity. The focusing and collimating optical system (lenses) is then placed outside this cavity.

TABLE 4

| Material | $\Delta\lambda_i$ (μm) | Periodicity of the structure $V_\Delta = 2L_T$ (μm) | Maximum angle of rotation $\delta\alpha$ (°) |
|---|---|---|---|
| $KTiOPO_4$ | 0.8–0.95 | 3.5 | 56 |
| $RbTiOPO_4$ | 0.8–0.95 | 3.15 | 58 |
| $RbTiOAsO_4$ | 0.8–0.95 | 3.0 | 58 |
| $LiNbO_4$ | 0.75–0.95 | 2.0 | 64 |
| $LiTaO_4$ | 0.64–0.95 | 1.3 | 76 |
| $CsTiOAsO_4$ | 0.8–0.95 | 2.7 | 60 |
| $KTiOAsO_4$ | 0.8–0.95 | 3.0 | 59 |

For example, a cylinder of $LiTaO_3$ with periodically alternating domains may be used for generating a tunable laser radiation of a short wavelength. The structure has a periodicity of 1.31 μm, a radius R=8 mm and a thickness of 0.5 mm. The rotation of the structure is performed around the binary Z axis, on a micrometric rotary support. It enables the frequency of the incident laser radiation emitted by a titanium-sapphire laser or by a tunable OPO, to be doubled.

Example 11

Non Linear Crystal with Crown for Quasi-phase Tuning

For certain materials, notably for those likely to exhibit brittleness at the interface between the + zone and the − zone, it is contemplated not to modulate the sign of the effective non-linear coefficient in the peripheral portion of the volume of the cylinder or cylindroid. This new configuration of the network is illustrated by FIG. 10.

The non-linear medium is then formed by two concentric zones: the central zone is modulated (+, −), whereas the peripheral zone (crown C) has a non alternating effective non-linear coefficient, i.e., either + or −. This crown may for example have a width ρ of 1mm for an alternating central zone of diameter 25 mm. The advantage of this crown is to provide a good quality polished surface.

Example 12

Calculation of the Variation of the Coherence Length as a Function of the Angle of Rotation in the Case of a Periodic Elliptical Network An elliptical network instead of a plane network is also contemplated in the case when there are notably losses through refraction or diffusion at the plane interfaces of the + and − zones under oblique incidence.

FIG. 11 describes a device with an electrical curved network for quasi phase tuning according to the present invention. The cylindroid with axis of revolution O has an elliptical contour with major axis OA and minor axis OB. In two angular sectors facing each other with an aperture β which may be between 0° and 180°, identical networks are inserted, formed of elliptical crowns the axis of which coincide with OA and OB. These crowns are alternately + and − with a period given according to a radius of the ellipse located by angle α, $\Delta(\alpha)=2L_c(\alpha)$; $\Delta(\alpha)$ varies in function of α from $\Delta_{min}$ to $\Delta_{max}$, thus providing quasi phase tuning for frequency conversion interactions for which the coherence length $L_c(\alpha)$ is between $Lc_{min}=P_{min}$ and $Lc_{max}=P_{max}$. If α is located with respect to the major axis OA and for β=90°, the coherence length in function of α is given by the following relationship:

$$L_c(\alpha) = \frac{1}{\sqrt{\frac{\cos^2\alpha}{P_{max}^2} + \frac{\sin^2\alpha}{P_{min}^2}}} \qquad (20)$$

Thus, the tenability of the device is achieved by rotation of the ellipse around O. When the radiations propagate along an α axis of the ellipse, they form an angle $i(\alpha)$ with the normal of the surface unit of the network, which is given by the following formula:

$$i(\alpha) = \text{Arccos}\left[\frac{P_{max}^2 + P_{min}^2}{\sqrt{\frac{\cos^2\alpha}{P_{max}^4} + \frac{\sin^2\alpha}{P_{min}^4}}}\right] \qquad (21)$$

For example, let us consider a OPO according to the present invention with a structure of $LiNbO_3$ with alternating ferroelectric domains forming an elliptical network with $P_{min}=26$ μm and $P_{max}=31.75$ μm. The angle of incidence $i(\alpha)$ calculated from formula (21) is equal to 0° along the major axis (α=0°) or along the minor axis (α=90°) and it reaches a maximum value of the order or 11° around α=45°. When this device is pumped at $\lambda_p=1.064$ μm, the rotation of the ellipse by an angle α between 0° and 90° enables a radiation to be generated with $\lambda_s$ between 1.33 μm and 2.12 μm and a radiation to be generated with $\lambda_1$ between 2.13 μm and 5.2 μm. The larger $i(\alpha)$, the larger are the losses at the interface. Thus, the advantage of an elliptical network with respect to a plane network is obvious here, as, for the same OPO, but with a plane network, described at line 8 of Table 3, the angle of rotation Δα which is also the angle of incidence with respect to the normal to the plane network reaches a maximum value of 36°.

FIG. 12 relates to a device derived from the one in FIG. 11: the non-linear medium is reduced to a portion of an ellipse with an aperture β between 0° and 180° wherein a network is inscribed, the period of which varying from $\Delta_{max}$ to $\Delta_{min}$. $S_1$ and $S_2$ are the two curved contours on the non-linear medium. The tunability of the device is obtained by rotation of the ellipse portion around point O.

Example 13

Calculation of the Variation of the Coherence Length as a Function of the Rotation Angle in the Case of a Periodic Circular Network Examples 7, 8, 9 and 10 relate to materials for which the index of refraction may vary or not as a function of α.

FIG. 13 relates to a device specific to crystals for which the refractive indexes, $N^+$ or $n^-$ defined in formula (4) of example 1, vary according to the direction of propagation in a given plane: this is the case in an arbitrary plane of a biaxial crystal or in the main (xz) and (yz) planes of an uniaxial crystal as defined in example 1. The non-linear crystal is machined into a cylinder, the plane of which is one of the planes described earlier so that the refractive index varies continuously from one radius to another. In the cylinder, a network is inscribed, formed by concentric circular crowns of width p, the periodicity of which Δ=2p is constant regardless of the relevant radius, located by angle α. Tunability of the device is however possible by varying the index of refraction as a function of the radius along which the radiations propagate. Thus, the coherence length depends on α. For example, for a parametric interaction with 3 waves of angular frequencies $\omega_1$, $\omega_2$, $\omega_3$, such that $\omega_1+\omega_2=\omega_3$, the length of coherence $L_c(\alpha)$ is given by the following relationship:

$$L_c(\alpha) = \frac{\pi c}{\omega_3 n(\omega_3, \alpha) - [\omega_1 n(\omega_1, \alpha) - \omega_2 n(\omega_2, \alpha)]} = \frac{\Delta}{2} = p \qquad (22)$$

$n(\omega_1, \alpha)$ is the index of refraction $n^+$ or $n^-$, at $\omega_1$, given by formula (4) of example 1, along the direction of propagation corresponding to a given angle of rotation α.

Thus, to each α corresponds a specific triplet ($\omega_1$, $\omega_2$, $\omega_3$): the tenability of the device is therefore actually obtained by rotation of the cylinder around its center.

For example, a cylinder machined in the (xy) plane of $CsTiOAsO_4$ in which is inscribed a network with period Δ=16 μm provides a frequency doubling interaction ($\omega_1=\omega_2=\omega, \omega_3=2\omega$). Both waves at fundamental angular frequency ω have an index of refraction $n(\lambda,\phi)$ such that:

$$n(\lambda, \phi) = [\cos^2\phi n_y^{-2}(\lambda) + \sin^2\phi n_x^{-2}(\lambda)]^{-1/2} \qquad (23)$$

$n_y(\lambda)$ and $n_x(\lambda)$ are given by Sellmeier's equations (8) from Example 1, φ is the angle formed by the direction of propagation with the x axis.

The generated wave has an index of refraction $n_z(\lambda)$ given by equation (8) of example 1. Such a structure provides doubling of frequency for wavelengths between 2.56 μm at φ=0° and 3.38 μm at φ=90°.

It is understood that the present invention is not limited to the described and illustrated embodiments above, but it encompasses all the alternatives. Thus notably, the crystal may have a volume of a cylinder 1, a volume of a cylindroid 2, a volume of a truncated cylinder 3 or a volume of a truncated cylindroid 4, or a volume of a portion 5 of a cylinder or cylindroid, as illustrated by FIG. 2. The cylinder or cylindroid may have a section selected from a circular section and an elliptical section.

What is claimed is:

1. A tunable frequency-converting device for generating an emerging optical beam having a first frequency from an incident optical beam having a second frequency comprising:
   a crystal with a non-linear optical property having a curved input surface for receiving the incident optical beam ensuring substantially normal incidence of the incident optical beam, and a curved output surface for transmitting the emerging optical beam, the crystal or the incident optical beam being rotatable around an axis of revolution, which is perpendicular to a normal to the input surface, for tuning the frequency of the emerging optical beam; and
   an optical system for confining and focusing said incident optical beam through the crystal via the input surface and a central portion of said crystal, and for collimating and directing said emerging optical beam from the output surface.

2. The device according to claim 1, wherein said crystal has a volume selected from a cylinder volume, a cylindroid volume, a truncated cylinder volume, a truncated cylindroid volume, a partial cylinder volume, and a partial cylindroid volume.

3. The device according to claim 2, wherein said volume has a section selected from a circular section and an elliptical section.

4. The device according to claim 1, wherein said crystal includes at least one hyperpolarizable chemical entity.

5. The device according to claim 1, wherein said crystal is a crystal selected from a crystal of $LiTaO_3$, $KTiOPO_4$, $KTiOAsO_4$, $RbTiOPO_4$, $RbTiOAsO_4$, $CsTiOAsO_4$, $\beta.BaB_2O_4$, $LiB_3O_5$, $KNbO_3$, $LiIO_3$, $LiNbO_3$, $KD_2PO_4$, $KH_2PO_4$, $NH_4H_2PO_4$, $CsDAsO_4$, $CsH_2AsO_4$, $AgGaS_2$, $AgGaSe_2$, $ZnGeP_2$, $Tl_3AsSe_3$ and a crystal of GaAs.

6. The device according to claim 1, wherein said crystal is selected from a micrometric size, a millimetric size and a centimetric size.

7. The device according to claim 1, wherein said optical system comprises two components, placed on opposite sides of said crystal, and selected from a convergent lens, a divergent lens, a set of lenses, a reflecting surface or mirror with a concave surface facing said crystal, and a reflecting surface or mirror with a convex surface facing said crystal.

8. The device according to claim 1, further comprising a rotary device, which rotates about a rotary mechanical axis, for supporting the crystal, wherein the axis of revolution of said crystal coincides with the rotary mechanical axis.

9. The device according to claim 1, wherein said crystal is a crystal with a phase matching property through birefringence.

10. The device according to claim 9, wherein said crystal is a monocrystalline crystal.

11. The device according to claim 1, wherein said crystal is a crystal with a quasi phase matching property.

12. The device according to claim 11, wherein said crystal has a periodically alternating juxtaposition of monocrystalline domains along a direction of propagation of the emerging optical beam.

13. The device according to claim 1, wherein said crystal is accessible to said incident optical beam under substantially normal incidence on the input surface of said crystal either by rotation of said crystal around the axis of revolution, or by rotation of said incident optical beam around said crystal in a plane orthogonal to the axis of revolution of said crystal.

14. The device according to claim 1, wherein said incident optical beam comprises a plurality of frequencies, with colinear or non-colinear wave vectors.

15. The device according to claim 1, wherein, said crystal has a network of monocrystalline domains selected from a network of plane monocrystalline domains, a network of circular monocrystalline domains, and a network of elliptical monocrystalline domains.

16. The device according to claim 1, wherein said crystal has a network of periodically alternating domains, optionally surrounded by a non-alternating monocrystalline crown.

17. The device according to claim 1, further comprising at least one additional incident optical beam; wherein each of said additional incident optical beams are laser beams, comprising one or more laser beams selected from a fixed frequency laser beam and a tunable frequency laser beam.

18. The device according to claim 1, wherein an interaction between electro-magnetic waves from the incident and emerging optical beams is a three-wave interaction or a four-wave interaction.

19. The device according to claim 18, wherein said crystal has a non-centrosymmetric structure so that said crystal provides a three-wave interaction.

20. The device according to claim 18, further comprising at least one additional incident optical beam, and at least one additional emerging optical beam; wherein said incident optical beams comprise two frequencies for a three-wave interaction, or three frequencies for a four-wave interaction, and wherein at least one of said emerging optical beams comprise a frequency which corresponds to the sum of said two, or said three frequencies comprised in said incident optical beams.

21. The device according to claim 18, further comprising at least one additional incident optical beam, and at least one additional emerging optical beam; wherein said incident optical beams comprise two frequencies for a three-wave interaction, or three frequencies for a four-wave interaction; and wherein at least one of said emerging optical beams comprise a frequency, which corresponds to a difference between said two, or said three frequencies comprised in said incident optical beam.

22. The device according to claim 18, wherein said emerging optical beam comprises two frequencies for a three-wave interaction, or three frequencies for a four-wave interaction, the sum of which is equal to a frequency comprised in said incident optical beam.

23. The device according to claim 18, wherein said interaction is an interaction with colinear wave vectors.

24. The device according to claim 18, wherein said interaction is an interaction with non-colinear wave vectors.

25. The device according to claim 18, wherein said interaction is an interaction selected from an optical parametric amplification, and a generation of second or third harmonic.

26. The device according to claim 18, wherein said crystal is placed inside a cavity providing a resonant interaction, and wherein said optical system is placed outside said cavity.

27. The device according to claim 26, wherein said resonant interaction is an interaction with three or four waves selected from an optical parametric oscillation, an optical parametric amplification, and a generation of second or third harmonics.

28. The device according to claim 26, wherein said cavity includes input and output reflecting surfaces facing each other providing resonance for at least one of the interacting waves.

29. The device according to claim 28, wherein said input reflecting surface is selected from a plane reflecting surface and a reflecting surface having a radius of curvature, with a concave surface facing said crystal or a convex surface facing said crystal, in order to optimize the oscillation threshold and the stability of the cavity.

30. The device according to claim 28, wherein said at least one resonant wave has a non-zero double refraction angle $\rho$, and wherein said output reflecting surface has a concave surface facing said crystal or a convex surface facing said crystal, so that the outgoing and returning beams coincide.

31. The device according to claim 28, wherein said at least one resonant wave has a non-zero double refraction angle $\rho$, and wherein said output reflecting surface is placed at a distance d from said crystal and has a radius of curvature R, the respective values of which satisfy equation R=d−L with d larger than L for a concavity orientated on one side of said crystal, or the equation R=L−d with d less than L for a concavity orientated on the opposite side of said crystal, with L defined as $L=R_c(\cos(2\rho)+(\sin(2\rho)/\tan(\rho_e))-1)$, with $R_c$ the radius of the cylindrical volume of revolution, $\rho$ the double refraction angle and with $\rho_e$ defined by $\rho_e=\arcsin(n\sin(2\rho)-2\rho)$, with n being the refractive index of said at least one wave for which resonance is sought.

32. The device according to claim 28, wherein said at least one resonant wave has a zero double refraction angle $\rho$, and wherein said output reflecting surface is selected from a plane reflecting surface and a reflecting surface having a radius of curvature, with a concave surface facing said crystal or a convex surface facing said crystal in order to optimize the oscillation threshold and the stability of the cavity.

33. The device according to claim 1, wherein said first frequency is equal to the double or the triple of the second frequency.

34. The device according to claim 1, further comprising means for thermostatic control of said crystal.

35. The device according to claim 1, wherein said crystal is held at a temperature different from room temperature.

36. The device according to claim 1, further comprising means for applying a static or low frequency electric field to the inside of said crystal.

37. The device according to claim 1, further comprising a pair of electrodes placed on opposite faces of said crystal.

38. The device according to claim 1, wherein the device forms a component selected from a spectroscope component, a remote detection system component, a remote transmission system component, a remote guiding system component, a LIDAR system component, and an optronic counter-measure system component.

* * * * *

UNITED STATES PATENT AND TRADEMARK OFFICE
CERTIFICATE OF CORRECTION

PATENT NO. : 6,882,465 B1
DATED : April 19, 2005
INVENTOR(S) : Boulanger et al.

It is certified that error appears in the above-identified patent and that said Letters Patent is hereby corrected as shown below:

Column 1,
Line 35, "optimal interaction" should read -- optical interaction --.

Column 2,
Line 49, "qaudrants" should read -- quadrants --.

Column 3,
Line 15, "normal to near normal" should read -- normal or near normal --.
Line 61, "centrimetric" should read -- centimetric --.

Column 4,
Line 21, "geniometric" should read -- goniometric --.
Line 30, "i.e., juxtaposition" should read -- i.e., a juxtaposition --.
Line 47, "refraction index" should read -- refractive index --.

Column 6,
Line 32, "optical parameter" should read -- optical parametric --.

Column 7,
Line 25, "width" should read -- with --.
Line 29, "tan($\rho_c$) should read -- tan($\rho_e$) --.
Line 67, "inside and said" should read -- inside said --.

Column 8,
Line 39, "times" should read -- items --.

Column 10,
Line 3, "$n(\omega_1)<n(\omega_i)$ when $\omega_1<\omega_2$" should read -- $n(\omega_i)<n(\omega_j)$ when $\omega_i<\omega_j$ --.

UNITED STATES PATENT AND TRADEMARK OFFICE
CERTIFICATE OF CORRECTION

PATENT NO. : 6,882,465 B1
DATED : April 19, 2005
INVENTOR(S) : Boulanger et al.

It is certified that error appears in the above-identified patent and that said Letters Patent is hereby corrected as shown below:

Column 18,
Line 10, Equation (17) "
$$L_c = \frac{\pi c}{\omega_1 n(\omega_1) - [\omega_1 n(\omega_1) + \omega_2 n(\omega_2)]}$$
"

should read --
$$L_c = \frac{\pi c}{\omega_3 n(\omega_3) - [\omega_1 n(\omega_1) + \omega_2 n(\omega_2)]}$$
--.

Signed and Sealed this

Twenty-first Day of February, 2006

JON W. DUDAS
*Director of the United States Patent and Trademark Office*